(12) United States Patent
Cha et al.

(10) Patent No.: US 11,296,917 B2
(45) Date of Patent: Apr. 5, 2022

(54) METHOD FOR TRANSMITTING DEMODULATION REFERENCE SIGNAL FOR UPLINK CONTROL SIGNAL IN WIRELESS COMMUNICATION SYSTEM AND DEVICE THEREFOR

(71) Applicant: LG Electronics Inc., Seoul (KR)

(72) Inventors: Hyunsu Cha, Seoul (KR); Sukhyon Yoon, Seoul (KR); Kilbom Lee, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/954,892

(22) PCT Filed: Feb. 17, 2020

(86) PCT No.: PCT/KR2020/002187
§ 371 (c)(1),
(2) Date: Jun. 17, 2020

(87) PCT Pub. No.: WO2020/167075
PCT Pub. Date: Aug. 20, 2020

(65) Prior Publication Data
US 2021/0367820 A1    Nov. 25, 2021

Related U.S. Application Data

(60) Provisional application No. 62/806,719, filed on Feb. 15, 2019.

(30) Foreign Application Priority Data

Feb. 15, 2019  (KR) .................. 10-2019-0017735
Mar. 25, 2019  (KR) .................. 10-2019-0033972

(51) Int. Cl.
*H04L 27/26*    (2006.01)
*H04W 52/42*    (2009.01)
*H04L 5/00*     (2006.01)
*H04L 5/02*     (2006.01)

(52) U.S. Cl.
CPC ........ *H04L 27/2621* (2013.01); *H04L 5/0048* (2013.01); *H04L 5/023* (2013.01); *H04W 52/42* (2013.01)

(58) Field of Classification Search
CPC ... H04L 27/2621; H04L 5/0048; H04L 5/023; H04W 52/42
See application file for complete search history.

(56) References Cited

FOREIGN PATENT DOCUMENTS

KR    20180133163    12/2018
WO    WO2018174687   9/2018

OTHER PUBLICATIONS

Huawei, HiSilicon, "Discussion on DMRS sequence design for low PAPR," R1-1900020, 3GPP TSG RAN WG1 Ad-Hoc Meeting 1901, Taipei, Jan. 21-25, 2019, 15 pages.
(Continued)

*Primary Examiner* — Elton Williams
(74) *Attorney, Agent, or Firm* — Fish & Richardson P.C.

(57) ABSTRACT

Disclosed herein is a method for transmitting a demodulation reference signal for an uplink control signal in a wireless communication system.
Specifically, the method performed by a terminal includes: generating a low peak to average power ratio (PAPR) sequence based on a length-6 sequence; generating a sequence used for the demodulation reference signal based on the low PAPR sequence; and transmitting, to a base station, the demodulation reference signal based on the sequence used for the demodulation reference signal, in which the length-6 sequence has an 8-phase shift keying (PSK) symbol as each element of a sequence.

19 Claims, 23 Drawing Sheets

(56) References Cited

OTHER PUBLICATIONS

Intel Corporation, "Low PAPR Reference Signals," R1-1813892, 3GPP TSG RAN WG1 Meeting #95, Spokane, USA, Nov. 12-16, 2018, 14 pages.
InterDigital, Inc., "On Low PAPR RS," R1-1900811, 3GPP TSG RAN WG1 Ad-Hoc Meeting 1901, Taipei, Taiwan, Jan. 21-25, 2019, 11 pages.
LG Electronics, "Remaining aspects of long PUCCH for UCI of up to 2 bits," R1-1719924, 3GPP TSG RAN WG1 Meeting 91, Reno, USA, Nov. 27-Dec. 1, 2017, 6 pages.
PCT International Search Report in International Appln. No. PCT/KR2020/002187, dated Jul. 6, 2020, 7 pages (with English translation).
Qualcomm Incorporated, "Lower PAPR reference signals," R1-1901317, 3GPP TSG RAN WG1 Ad-Hoc Meeting 1901, Taipei, Taiwan, dated Jan. 21-25, 2019, 25 pages.
Korean Notice of Allowance in Korean Application No. 10-2020-0019026, dated Nov. 5, 2020, 10 pages (with English translation).
3GPP, "3rd Generation Partnership Project; Technical Specification Group Radio Access Network; NR; Physical channels and modulation (Release 15)," TS 38.211 V15.4.0, Dec. 12, 96 pages.
Extended European Search Report in European Appln. No. 20737326.7, dated Oct. 1, 2021, 9 pages.
Huawei & HiSilicon, "Evaluation results of sequence design for Pi/2-BPSK DFT-S-OFDM," R1-1901239, Presented at 3GPP T SG RAN WG1 Ad-Hoc Meeting 1901, Taipei, Jan. 21-25, 2019, 11 pages.
Office Action in Japanese Appln. No. 2020-533147, dated Aug. 17, 2021, 12 pages (with English translation).
Qualcomm Incorporated, "Lower PAPR reference signals," R1-1813445, Presented at 3GPP TSG RAN WG1 Meeting #95, Spokane, WA, USA, Nov. 12-16, 2018, 24 pages.

METHOD FOR TRANSMITTING DEMODULATION REFERENCE SIGNAL FOR UPLINK CONTROL SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2020/002187, filed on Feb. 17, 2020, which claims the benefit of U.S. Provisional Application No. 62/806,719 filed on Feb. 15, 2020, KR Application No. 10-2019-0017735 filed on Feb. 15, 2019 and KR Application No. 10-2019-0033972 filed on Mar. 25, 2019, the contents of which are all hereby incorporated by reference herein in their entirety.

TECHNICAL FIELD

The present disclosure relates to a wireless communication system, and more particularly, to a method for transmitting a demodulation reference signal for an uplink control signal and a device for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An embodiment of the present disclosure provides a method for transmitting a demodulation reference signal for an uplink control signal by using a low PAPR sequence.

The technical objects of the present disclosure are not limited to the aforementioned technical objects, and other technical objects, which are not mentioned above, will be apparently appreciated by a person having ordinary skill in the art from the following description.

Technical Solution

In an aspect, provided is a method for transmitting a demodulation reference signal for an uplink control signal in a wireless communication system, which is performed by a terminal, including: generating a low peak to average power ratio (PAPR) sequence based on a length-6 sequence; generating a sequence used for the demodulation reference signal based on the low PAPR sequence; and transmitting, to a base station, the demodulation reference signal based on the sequence used for the demodulation reference signal, in which the length-6 sequence has an 8-phase shift keying (PSK) symbol as each element of a sequence.

Further, in the present disclosure, the length-6 sequence is determined by $e^{j\varphi(i)\pi/8}$, and the i is an index of elements of the length-6 sequence.

Further, in the present disclosure, a value of the $\varphi(i)$ includes (−1 −7 −3 −5 −1 3), (−7 3 −7 5 −7 −3), (5 −7 7 1 5 1), (−7 3 1 5 −1 3), (−7 −5 −1 −7 −5 5), (−7 1 −3 3 7 5), and (−7 1 −3 1 5 1).

Further, in the present disclosure, a cyclic shifted sequence for the $\varphi(i)$ is the same sequence as the $\varphi(i)$.

Further, in the present disclosure, a number which the value of $\varphi(i)$ may have is $8^6$.

Further, in the present disclosure, a value of auto-correlation for the low PAPR sequence is less than a specific value.

Further, in the present disclosure, the method further includes receiving, from the base station, RRC signaling including control information indicating that transform precoding for uplink is enabled.

Further, in the present disclosure, the method further includes applying a Frequency Domain Spectrum Shaping (FDSS) filter to the low PAPR sequence.

Further, in the present disclosure, the low PAPR sequence is subject to Frequency Division Multiplexing (FDM) with two antenna ports in a Comb-2 form.

Further, in the present disclosure, different PAPR sequences are used for the two antenna ports, respectively.

Further, in another aspect, provided is a terminal for transmitting a demodulation reference signal for an uplink control signal in a wireless communication system, including: a transceiver transceiving a radio signal; and a processor functionally connected to the transceiver, in which the processor is configured to generate a low peak to average power ratio (PAPR) sequence based on a length-6 sequence, generate a sequence used for the demodulation reference signal based on the low PAPR sequence, and transmit, to a base station, the demodulation reference signal based on the sequence used for the demodulation reference signal, and in which the length-6 sequence has an 8-phase shift keying (PSK) symbol as each element of a sequence.

In yet another aspect, provided is an apparatus including: one or more memories; and one or more processors functionally connected to the one or more memories, in which the one or more processors control the apparatus to generate a low peak to average power ratio (PAPR) sequence based on a length-6 sequence, generate a sequence used for the demodulation reference signal based on the low PAPR sequence, and transmit, to a base station, the demodulation reference signal based on the sequence used for the demodulation reference signal, and in which wherein the length-6 sequence has an 8-phase shift keying (PSK) symbol as each element of a sequence.

Further, in still yet another aspect, provided are one or more non-transitory computer-readable recording media storing one or more instructions, in which one or more instructions executable by one or more processors control a terminal to generate a low peak to average power ratio (PAPR) sequence based on a length-6 sequence, generate a sequence used for the demodulation reference signal based on the low PAPR sequence, and transmit, to a base station, the demodulation reference signal based on the sequence used for the demodulation reference signal, and in which the length-6 sequence has an 8-phase shift keying (PSK) symbol as each element of a sequence.

Advantageous Effects

According to the present disclosure, there is an effect that PAPR performance can be enhanced by using a sequence constituted by M-PSK and/or M-QAM symbols.

Effects obtainable in the present disclosure are not limited to the aforementioned effects and other unmentioned effects will be clearly understood by those skilled in the art from the following description.

DESCRIPTION OF DRAWINGS

The accompanying drawings, which are included as part of the detailed description in order to provide a thorough understanding of the present disclosure, provide embodiments of the present disclosure and together with the description, describe the technical features of the present disclosure.

MODE FOR INVENTION

Figure 1:
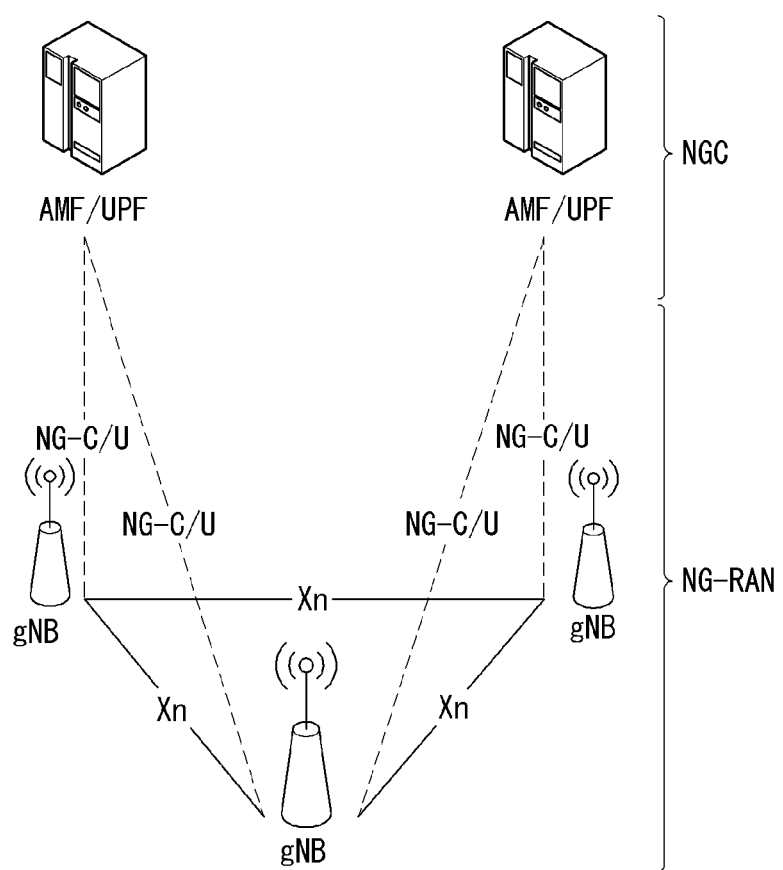
FIG. 1 is a diagram illustrating one example of an NR system architecture.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a robot, and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, a vehicle, a robot, an AI module, and the like.

The following technology may be used in various wireless access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification
NR Radio Access (NR)

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerology may be defined by scaling reference subcarrier spacing to an integer N.

System Architecture

FIG. 1 is a diagram illustrating one example of an NR system architecture.

Referring to FIG. 1, NG-RAN is constituted by an NG-RA user plane (new AS sublayer/PDCP/RLC/MAC/PHY) and gNBs providing a control plane (RRC) protocol termination for a user equipment (UE). The gNBs are interconnected through an Xn interface. The gNB is also connected to NGC through an NG interface. More specifically, the gNB is connected to an Access and Mobility Management Function (AMF) through an N2 interface and a User Plane Function (UPF) through an N3 interface.

Frame Structure

Figure 2:
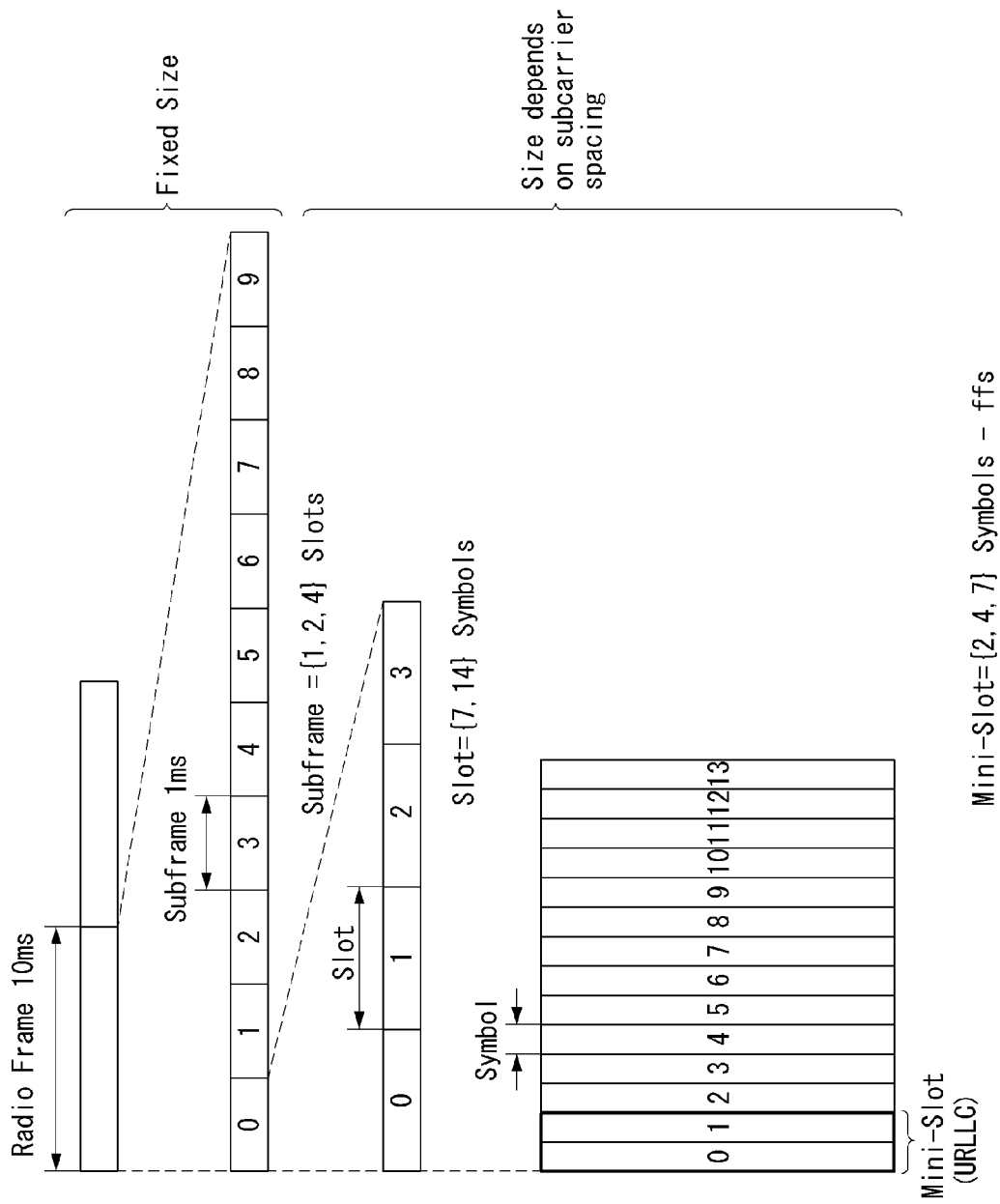
FIG. 2 is a diagram illustrating one example of a frame structure in NR.

FIG. 2 is a diagram illustrating one example of a frame structure in NR.

The NR system may support multiple numerologies. Here, the numerology may be defined by a subcarrier spacing and cyclic prefix (CP) overhead. In this case, multiple subcarrier spacings may be derived by scaling a basic subcarrier spacing with an integer N (or μ). Further, even if it is assumed that a very low subcarrier spacing is not used at a very high carrier frequency, the used numerology may be selected independently of a frequency band.

In addition, in the NR systems, various frame structures depending on multiple numerologies may be supported.

Hereinafter, Orthogonal Frequency Division Multiplexing (OFDM) numerology and the frame structure which may be considered in the NR system will be described.

Multiple OFDM numerologies supported in the NR systems may be defined as shown in Table 1.

TABLE 1

| μ | $\Delta f = 2^\mu \cdot 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 may mean a sub 6-GHz range and FR2 as above 6-GHz range may mean millimeter wave (mmW).

Table 2 below shows a definition of an NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With respect to the frame structure in the NR system, sizes of various fields of a time domain is expressed in multiples of a time unit of $T_s=1/(\Delta f_{max} \cdot N_f)$. Here, $\Delta f_{max}=480 \cdot 10^3$ and $N_f=4096$. Downlink and uplink transmission is configured by a radio frame having an interval of $T_f=(\Delta f_{max} N_f/100) \cdot T_s=10$ ms. Here, the radio frame is constituted by 10 subframes each having an interval of $T_{sf}=(\Delta f_{max} \cdot N_f/1000) \cdot T_s=1$ ms. In this case, there may be one set of frames for uplink and one set of frames for downlink.

Further, transmission of uplink frame number i from the user equipment (UE) should be started earlier than the start of the downlink frame in the corresponding UE by $T_{TA}=N_{TA} T_s$.

For numerology μ, slots are numbered in an increasing order of $n_s^\mu \in \{0, \ldots, N_{subframe}^{slots,\mu}-1\}$ in the subframe and numbered in an increasing order of $n_{s,f}^\mu \in \{0, \ldots, N_{frame}^{slots,\mu}-1\}$ in the radio frame. One slot is constituted by $N_{symb}^\mu$ consecutive OFDM symbols and $N_{symb}^\mu$ is determined according to the used numerology and a slot configuration. A start of slot $n_s^\mu$ in the subframe is temporally aligned with the start of OFDM symbol $n_s^\mu N_{symb}^\mu$ symb in the same subframe.

All UEs may not simultaneously perform transmission and reception and this means that all OFDM symbols of a downlink slot or an uplink slot may not be used.

Table 3 shows the number $N_{symb}^{slot}$ of OFDM symbols for each slot, the number $N_{slot}^{frame,\mu}$ of slots for each radio frame, and the number $N_{slot}^{subframe,\mu}$ of slots for each subframe in a normal CP and Table 4 shows the number of OFDM symbols for each slot, the number of slots for each radio frame, and the number of slots for each subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 illustrates one example of a case where $\mu=2$ and referring to Table 3, 1 subframe may include 4 slots. 1 subframe={1, 2, 4} slots illustrated in FIG. 2 is one example and the number of slots which may be included in 1 subframe is defined as shown in Table 3 or 4.

Further, mini-slot may include 2, 4, or 7 symbols or may include more symbols or less symbols therethan.

Physical Resource

With respect to the physical resource in the NR system, an antenna port, a resource grid, a resource element, a resource block, a carrier part, and the like may be considered.

Hereinafter, the physical resources which may be considered in the NR system will be described in detail.

First, with respect to the antenna port, the antenna port is defined so that a channel in which the symbol on the antenna port is transported may be inferred from a channel in which different symbols on the same antenna port are transported. When a large-scale property of a channel in which a symbol on one antenna port is transported may be interred from a channel in which symbols on different antenna ports are transported, two antenna ports may have a quasi co-located or quasi co-location (QC/QCL) relationship. Here, the large-scale property includes at least one of a delay spread, a Doppler spread, a frequency shift, average received power, and a received timing.

Figure 3:
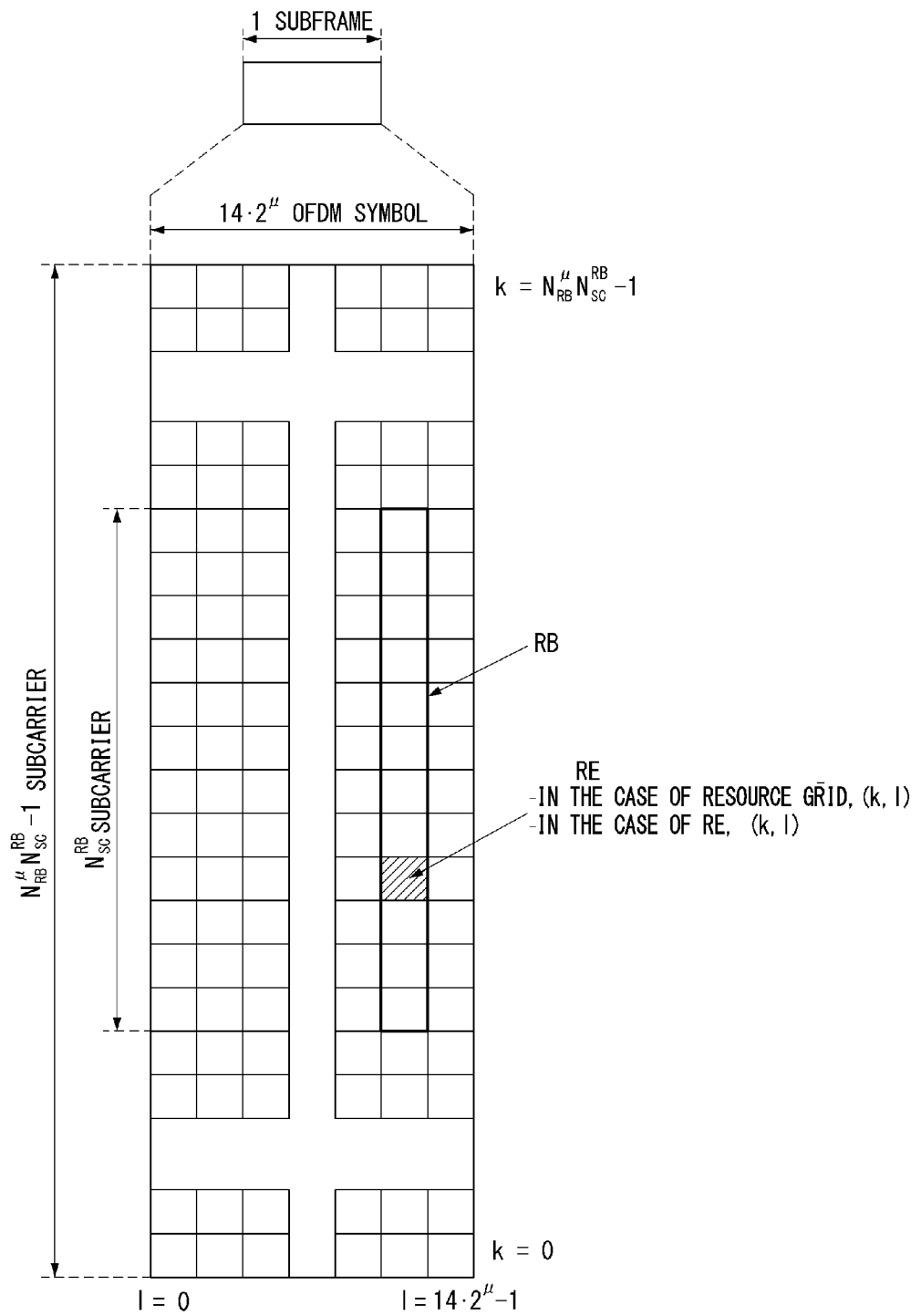
FIG. 3 illustrates one example of a resource grid in NR.

FIG. 3 illustrates one example of a resource grid in NR.

Referring to FIG. 3, it is exemplarily described that the resource grid is constituted by $N_{RB}^{\mu}N_{sc}^{RB}$ subcarriers on the frequency domain and one subframe is constituted by $14 \cdot 2^\mu$ OFDM symbols, but the present disclosure is not limited thereto.

In the NR system, a transmitted signal is described by one or more resource grids constituted by $N_{RB}^{\mu}N_{sc}^{RB}$ subcarriers and $2^\mu N_{symb}^{(\mu)}$ OFDM symbols. Here, $N_{RB}^{\mu} \leq N_{RB}^{max,\mu}$. The $N_{RB}^{max,\mu}$ represents a maximum transmission bandwidth and this may vary between uplink and downlink in addition to numerologies.

In this case, as illustrated in FIG. 2, one resource grid may be configured for each numerology $\mu$ and antenna port p.

Each resource element of the resource grid for the numerology $\mu$ and the antenna port p is referred to as the resource element and uniquely identified by an index pair (k, l). Here, $k=0, \ldots, N_{RB}^{\mu}N_{sc}^{RB}-1$ represents an index on the frequency domain and $l=0, \ldots, 2^\mu N_{symb}^{(\mu)}-1$ refers to the position of the symbol in the subframe. When the resource element in the slot is referred to, the index pair (k,l) is used. Here, $l=0, \ldots, N_{symb}^{\mu}-1$.

A resource element for the numerology $\mu$ and the antenna port p corresponds to a complex value $a_{k,l}^{(p,\mu)}$. When there is no risk of confusion or when a specific antenna port or numerology is not specified, the indexes p and $\mu$ may be dropped, and as a result, the complex value may be $a_{k,l}^{(p)}$ or $a_{k,l}$.

Further, the resource block (RB) is defined $N_{sc}^{RB}=12$ consecutive subcarriers on the frequency domain.

Point A serves as a common reference point of a resource block grid and is acquired as follows.

OffsetToPointA for PCell downlink indicates the frequency offset between the lowest subcarrier of the lowest resource block overlapping the SS/PBCH block used by the UE for initial cell selection and point A and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upward from 0 in the frequency domain for a subcarrier spacing configuration $\mu$.

A center of subcarrier 0 common resource block 0 for the subcarrier spacing configuration $\mu$ coincides with 'point A'. A resource element (k,l) for the common resource block number $n_{CRB}^{\mu}$ and the subcarrier spacing configuration P in the frequency domain is given as shown in Equation 1 below.

$$n_{CRB}^{\mu} = \left\lfloor \frac{k}{N_{sc}^{RB}} \right\rfloor \quad \text{[Equation 1]}$$

Here, k is relatively defined at point A so that k=0 to correspond to the subcarrier centering point A. Physical resource blocks are numbered from 0 to $N_{BWP,i}^{size}-1$ within a bandwidth part (BWP) and represents the number of the BWP. A relationship between physical resource block $n_{PRB}$ and common resource bock $n_{CRB}$ is given by Equation D2 below.

$$n_{CRB}=n_{PRB}+N_{BWP,i}^{start} \quad \text{[Equation 2]}$$

Here, $N_{BWP,i}^{start}$ represents a common resource block in which the BWP relatively starts to common resource block 0.

Figure 4:
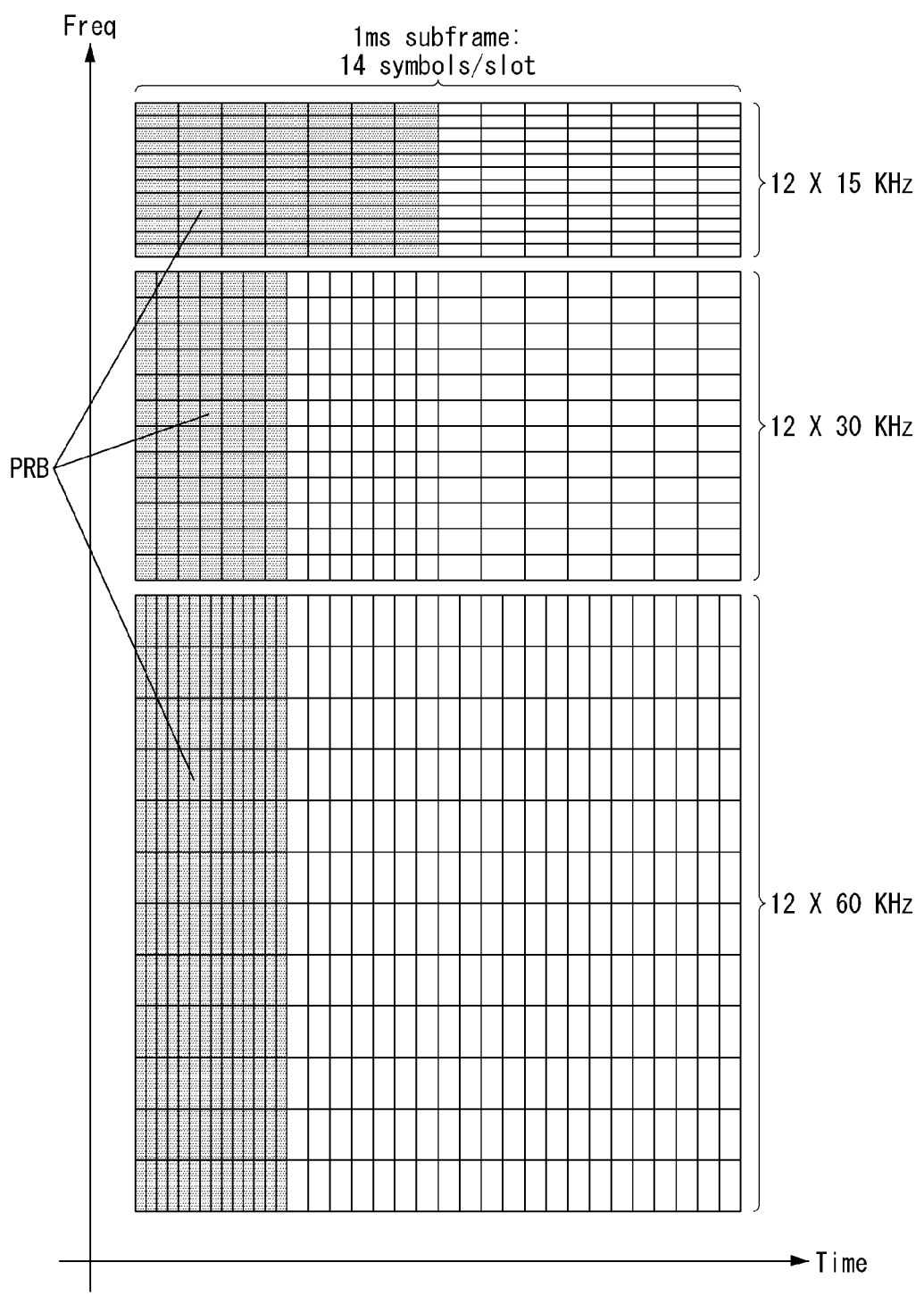
FIG. 4 is a diagram illustrating one example of a physical resource block in NR.

FIG. 4 is a diagram illustrating one example of a physical resource block in NR.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, Mmtc, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the eNB may instruct the UE to operate only in a partial bandwidth rather than the entire bandwidth of the wideband CC and the corresponding partial bandwidth is defined as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

3GPP Signal Transmitting and Receiving Method

Figure 5:
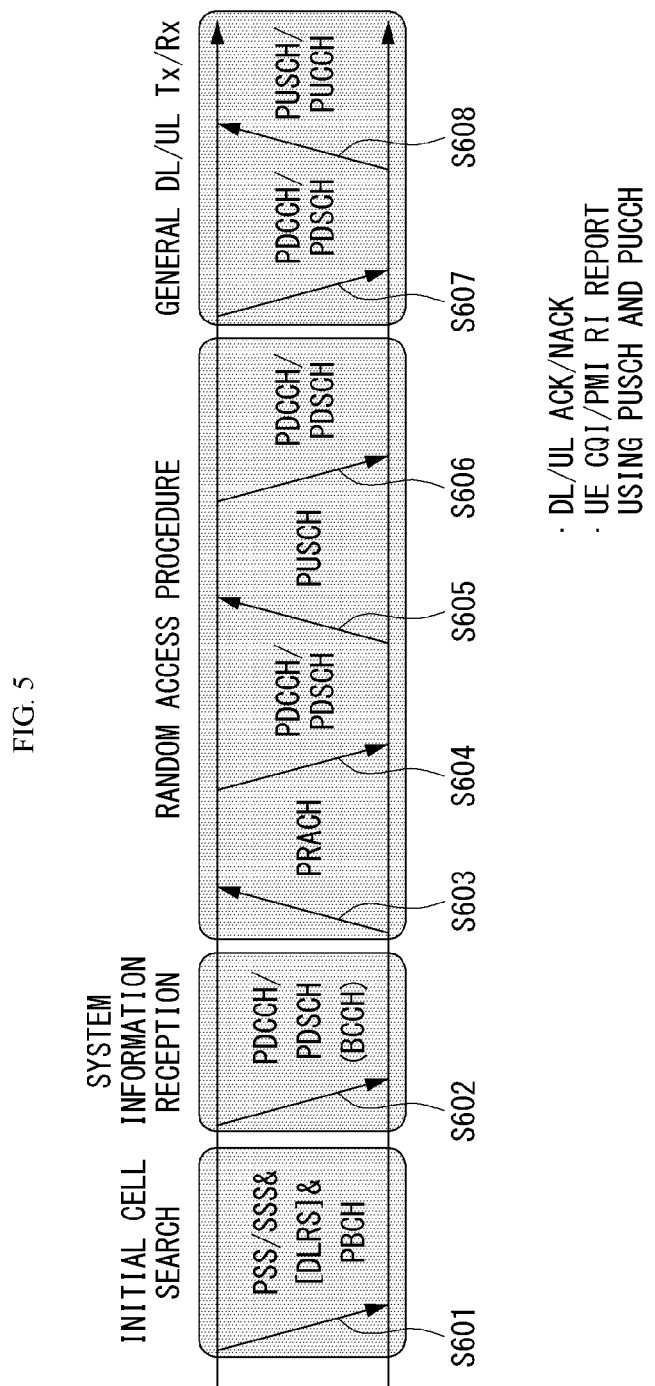
FIG. 5 is a diagram illustrating one example of a 3GPP signal transmitting and receiving method.

FIG. 5 is a diagram illustrating one example of a 3GPP signal transmitting and receiving method.

Referring to FIG. 5, when the UE is powered on or newly enters a cell, the UE performs an initial cell search operation such as synchronizing with the eNB (S201). To this end, the UE may receive a Primary Synchronization Channel (P-SCH) and a Secondary Synchronization Channel (S-SCH) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message for the preamble through the PDCCH and a corresponding PDSCH (S204 and S206). In the case of a contention based RACH, a Contention Resolution Procedure may be additionally performed.

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE receives Downlink Control Information (DCI) through the PDCCH. Here, the DCI may include control information such as resource allocation information for the UE and formats may be different from each other according to a use purpose.

Meanwhile, the control information which the UE transmits to the eNB through the uplink or the UE receives from the eNB includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as the CQI/PMI/RI, etc., through the PUSCH and/or PUCCH.

Table 5 shows one example of a DCI format in the NR system.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 5, DCI format 0_0 is used for scheduling of the PUSCH in one cell.

Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is sued for scheduling of the PDSCH in one DL cell. Information included in DCI format 1_0 is CRC-scrambled and transmitted by C-RNTI, CS-RNTI, or MCS-C-RNTI. DCI format 1_1 is sued for scheduling of the PDSCH in one cell. Information included in DCI format 1_1 is CRC-scrambled and transmitted by C-RNTI, CS-RNTI, or MCS-C-RNTI. DCI format 2_1 is used to inform PRB(s) and OFDM symbol(s) of which the UE may assume not intending transmission.

The following information included in DCI format 2_1 is CRC-scrambled and transmitted by INT-RNTI.

preemption indication 1, preemption indication 2, . . . , preemption indication N.

Block Diagram of Wireless Communication System

Figure 6:
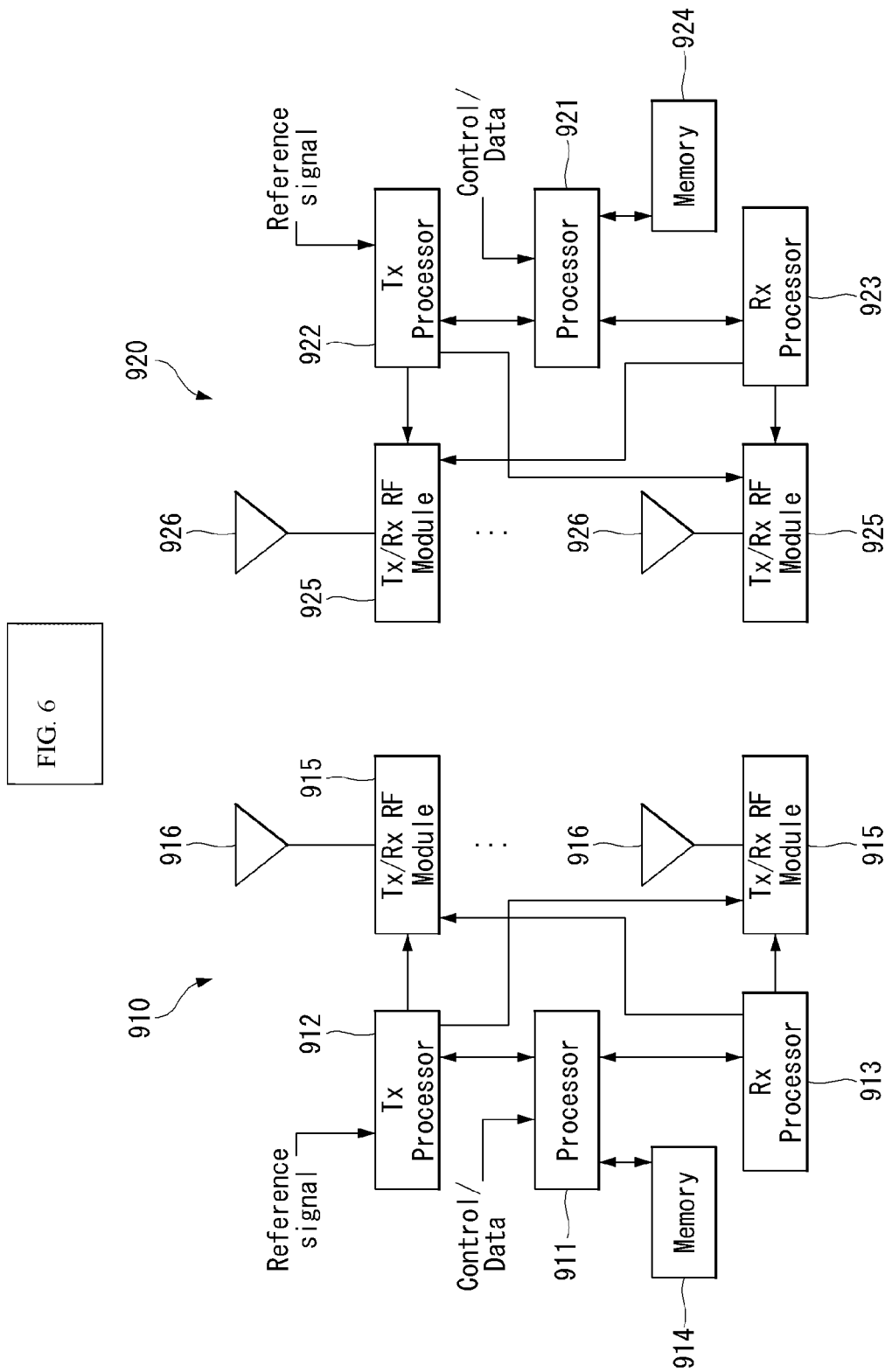
FIG. 6 is a block diagram of a wireless communication system to which methods proposed in the present disclosure may be applied.

FIG. 6 is a block diagram of a wireless communication system to which methods proposed in the present disclosure may be applied.

Referring to FIG. 6, a wireless communication system includes a first communication device 910 and/or a second communication device 920. The expression of 'A and/or B' may be construed as the same meaning as 'including at least one of A and B'. The first communication device may indicate the eNB and the second communication device may indicate the UE (or the first communication device may indicate the UE and the second communication device may indicate the eNB).

A base station (BS) may be replaced with terms including a fixed station, a Node B, an evolved-NodeB (eNB), a Next Generation NodeB (gNB), a base transceiver system (BTS), an access point (AP), general NB (gNB), a 5G system, a network, an AI system, a road side unit (RSU), a robot, and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, a vehicle, a robot, an AI module, and the like.

The first communication device and the second communication device include processors 911 and 921, memories 914 and 924, one or more Tx/Rx radio frequency (RF) modules 915 and 925, Tx processors 912 and 922, Rx processors 913 and 923, and antennas 916 and 926. The processor implements a function, a process, and/or a method which are described above. More specifically, a higher layer packet from a core network is provided to the processor 911 in DL (communication from the first communication device to the second communication device). The processor implements a function of an L2 layer. In the DL, the processor provides multiplexing between a logical channel and a transmission channel and allocation of radio resources to the second communication device 920 and takes charge of signaling to the second communication device. The transmit (TX) processor 912 implement various signal processing functions for an L1 layer (i.e., physical layer). The signal processing functions facilitate forward error correction (FEC) at the second communication device and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 916 via individual Tx/Rx modules (or transceivers, 915). Each Tx/Rx module may modulate an RF carrier into each spatial stream for transmission. In the second communication device, each Tx/Rx module (or transceiver, 925) receives a signal through each antenna 926 of each Tx/Rx module. Each Tx/Rx module reconstructs information modulated with the RF carrier and provides the reconstructed information to the receive (RX) processor 923. The RX processor implements various signal processing functions of layer 1. The RX processor may perform spatial processing on information in order to reconstruct an arbitrary spatial stream which is directed for the second communication device. When multiple spatial streams are directed to the second communication device, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the first communication device. The soft decisions may be based on channel estimation values. The soft decisions are decoded and deinterleaved to reconstruct data and control signals originally transmitted by the first communication device on the physical channel. The corresponding data and control signals are provided to the processor 921.

UL (communication from the second communication device to the first communication device) is processed by the first communication device 910 in a scheme similar to a description of a receiver function in the second communication device 920. Each Tx/Rx module 925 receives the signal through each antenna 926. Each Tx/Rx module provides the RF carrier and information to the RX processor 923. The processor 921 may be associated with the memory 924 storing a program code and data. The memory may be referred to as a computer readable medium.

Abbreviation and Definition

Figure 7:
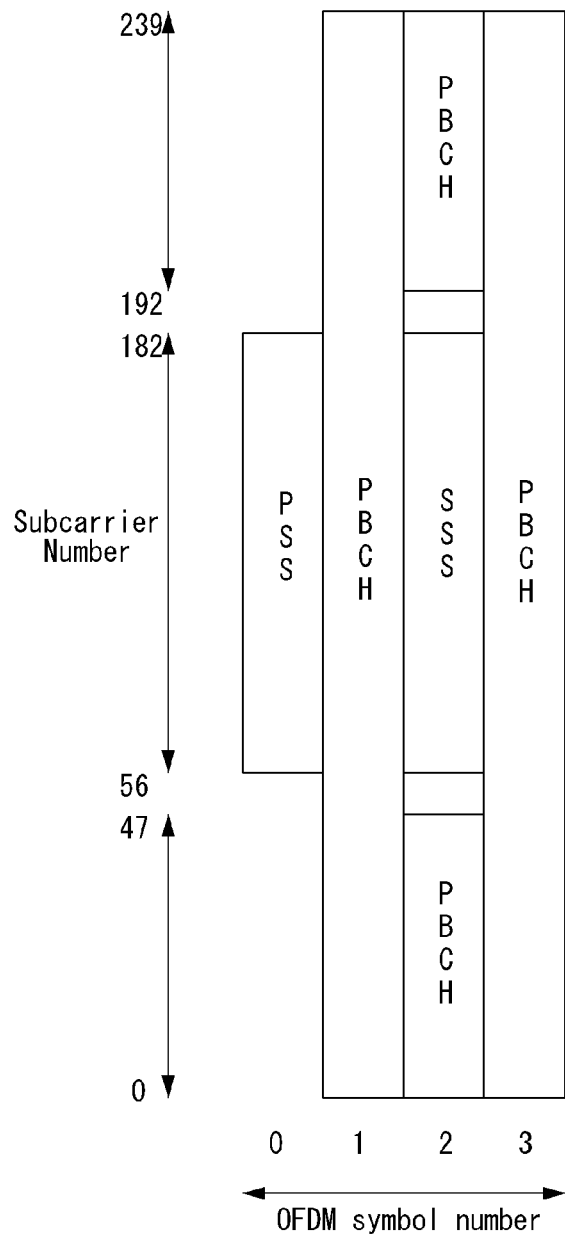
FIG. 7 illustrates an SSB structure.

PUSCH: Physical Uplink Shared Channel
PUCCH: Physical Uplink Control Channel
FDSS: Frequency Domain Spectrum Shaping
PSK: Phase Shift Keying
QAM: Quadrature Amplitude Modulation
PAPR: Peak-to-Average Power Ratio
DMRS: DeModulation Reference Signals
ACK: Acknowledgement
NACK: Negative Acknowledgement
CA: Carrier aggregation
DCI: Downlink Control format Indicator/index
MAC-CE: Multiple Access Channel Control Elements
BWP: Bandwidth part
RF: Radio frequency
CC: Component carrier
SS: Synchronization Signals
SSB: Synchronization signal block—The SSB is regarded to be the same as the SS/PBCH block in the present disclosure.
SSBRI: SSB resource index/indicator
IM: Interference measurement
FDM: Frequency division multiplexing
TDM: Time division multiplexing
RS: Reference Signal(s)
CSI-RS or CSIRS: Channel State Information Reference Signals
CSI-IM: Channel State Information Interference Measurement
CRI: CSI-RS resource index/indicator
DM-RS or DMRS: Demodulation Reference Signals
MAC: Medium Access Control
MAC-CE: Medium Access Control Channel Element
NZP: Non Zero Power
ZP: Zero power
PT-RS or PTRS: Phase Tracking Reference Signals
SRS: Sounding Reference Signals
SRI: SRS resource index/indicator
PRS: Positioning Reference Signals
PRI: PRS resource index/indicator
OFDM: Orthogonal Frequency Division Multiplexing
TX: Transmitter
TP: Transmission Point
BS: Base station
RX: Receiver
RRC: Radio Resource Control
RSRP: Reference Signal Received Power
RSRQ: Reference Signal Received Quality
SNR: Signal to Noise Ratio
SINR: Signal to Interference plus Noise Ratio
URLLC: Ultra Reliable Low Latency Communication
PUSCH: Physical Uplink Shared Channels
PUCCH: Physical Uplink Control Channels
PDCCH: Physical Downlink Control Channels
PDSCH: Physical Downlink Shared Channels
ID: Identity (or meaning identity/identification number)
UL: Uplink
DL: Downlink
UE: User equipment (meaning the UE)

gNB: generic NodeB (similar concept to the eNB)
Initial Access (IA) Procedure
Synchronization Signal Block (SSB) transmission and related operation FIG. 7 illustrates an SSB structure. The UE may perform cell search, system information acquisition, beam alignment for initial access, DL measurement, etc., based on an SSB. The SSB is mixedly used with an SS/Synchronization Signal/Physical Broadcast channel (PBCH) block.

Referring to FIG. 7, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 6 below.

TABLE 6

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There are 336 cell ID groups, and three cell IDs exist for each cell ID group. There may be a total of 1008 cell IDs and the cell ID may be defined by Equation 3.

$$N_{ID}^{cell} = 3N_{ID}^{(1)} + N_{ID}^{(2)}$$ [Equation 3]

Here, $N_{ID}^{(1)} \in \{0, 1, \ldots, 335\}$ and $N_{ID}^{(2)} \in \{0,1,2\}$

Here, NcellID represents a cell ID (e.g., PCID). N(1)ID represents a cell ID group and is provided/acquired through the SSS. N(2)ID represents a cell ID in the cell ID group and is provided/acquired through the PSS.

PSS sequence dPSS(n) may be defined to satisfy Equation 4.

$$d_{PSS}(n) = 1 - 2x(m)$$

$$m = (n + 43 N_{ID}^{(2)}) \bmod 127$$

$$0 \le n < 127$$ [Equation 4]

Here, $x(i+7) = (x(i+4) + x(i)) \bmod 2$, and $$[x(6)\,x(5)\,x(4)\,x(3)\,x(2)\,x(1)\,x(0)] = [1\ 1\ 1\ 0\ 1\ 1\ 0].$$

SSS sequence dSSS(n) may be defined to satisfy Equation 5.

$$d_{SSS}(n) = [1 - 2x_0((n + m_0) \bmod 127)]$$ [Equation 5]
$$[1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

Here, $$x_0(i+7) = (x_0(i+4) + x_0(i)) \bmod 2$$

$$x_1(i+7) = (x_1(i+1) + x_1(i)) \bmod 2,$$

and $$[x_0(6)\ x_0(5)\ x_0(4)\ x_0(3)\ x_0(2)\ x_0(1)\ x_0(0)] =$$
$$[0\ 0\ 0\ 0\ 0\ 0\ 1]$$
$$[x_1(6)\ x_1(5)\ x_1(4)\ x_1(3)\ x_1(2)\ x_1(1)\ x_1(0)] =$$
$$[0\ 0\ 0\ 0\ 0\ 0\ 1].$$

Figure 8:
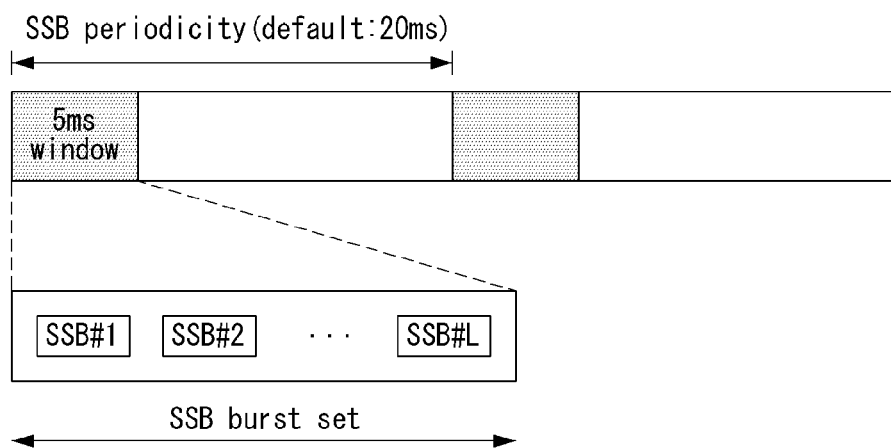
FIG. 8 illustrates SSB transmission.

FIG. 8 illustrates SSB transmission.

The SSB is periodically transmitted according to SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined as follows according to SCS. The time positions of the SSB candidates are indexed from 0 to L −1 in chronological order within the SSB burst set (i.e., half-frame).

Case A—15 kHz SCS: An index of a start symbol of the candidate SSB is given as {2, 8}+14*n. When a carrier frequency is 3 GHz or less, n=0, 1. When the carrier frequency is 3 to 6 GHz or less, n=0, 1, 2, 3.

Case B—30 kHz SCS: The index of the start symbol of the candidate SSB is given as {4, 8, 16, 20}+28*n. When the carrier frequency is 3 GHz or less, n=0. When the carrier frequency is 3 to 6 GHz, n=0, 1.

Case C—30 kHz SCS: The index of the start symbol of the candidate SSB is given as {2, 8}+14*n. When the carrier frequency is 3 GHz or less, n=0, 1. When the carrier frequency is 3 to 6 GHz or less, n=0, 1, 2, 3.

Case D—120 kHz SCS: The index of the start symbol of the candidate SSB is given as {4, 8, 16, 20}+28*n. When the carrier frequency is more than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. When the carrier frequency is more than 6 GHz, n=0, 1, 2, 3, 5, 6, 7, 8.

Figure 9:
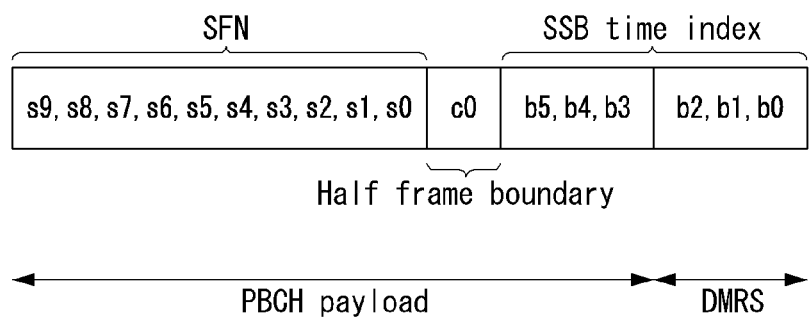
FIG. 9 illustrates that a UE acquires information on DL time synchronization.

FIG. 9 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences ([Equation 4] to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 3 bits which remain after indicating the SSB index among 3 bits which may be indicated by using eight PBCH DRMS sequences may be used for the half frame indication (b2).

System Information Acquisition

Figure 10:
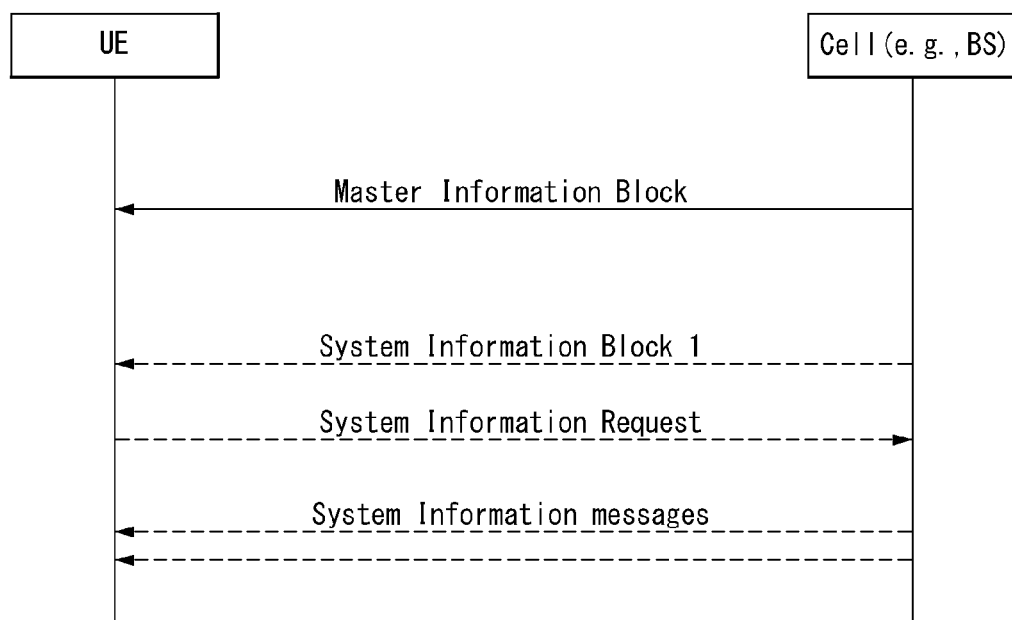
FIG. 10 illustrates a system information (SI) acquisition process.

FIG. 10 illustrates a system information (SI) acquisition process. The UE may acquire AS-/NAS-information through an SI acquisition process. The SI acquisition process may be applied to UEs which are in an RRC_IDLE state, an RRC_INACTIVE state, an RRC_CONNECTED state.

The SI is divided into a master information block (MIB) and a plurality of system information blocks (SIB). SI other than the MIB may be referred to as Remaining Minimum System Information (RSI). The following may be referred to for details.

The MIB includes information/parameters related to SystemInformationBlock1 (SIB1) reception and is transmitted through the PBCH of the SSB. In initial cell selection, the UE assumes that the half frame with the SSB is repeated with a periodicity of 20 ms. The UE may check whether a Control Resource Set (CORESET) for a Type0-PDCCH common search space exists based on the MIB. The Type0-PDCCH common search space is a kind of PDCCH search space and is used to transmit a PDCCH for scheduling an SI message. If there is the Type0-PDCCH common search space, the UE may (i) a plurality of continuous RBs and one or more continuous symbols constituting the CORESET and (ii) a PDCCH occasion (i.e., a time domain location for receiving the PDCCH) based on information (e.g., pdcch-ConfigSIB1) in the MIB. If there is no Type0-PDCCH common search space, pdcch-ConfigSIB1 provides information on a frequency location where SSB/SIB1 exists and a frequency range where the SSB/SIB1 does not exist.

The SIB1 contains information related to the availability and scheduling (e.g., transmission periodicity, SI-window size) of the remaining SIBs (hereinafter, referred to as SIBx, x is an integer of 2 or more). For example, the SIB1 may inform whether the SIBx is periodically broadcasted or whether the SIBx is provided by a request of the UE according to an on-demand scheme. When the SIBx is provided by the on-demand scheme, the SIB1 may include information which the UE requires for performing an SI request. The SIB1 is transmitted through the PDSCH, the PDCCH for scheduling the SIB1 is transmitted through the Type0-PDCCH common search space, and the SIB1 is transmitted through the PDSCH indicated by the PDCCH.

The SIBx is included in the SI message and transmitted through the PDSCH. Each SI message is transmitted within a time window (i.e., SI-window) which periodically occurs.

Channel Measurement and Rate-Matching

Figure 11:
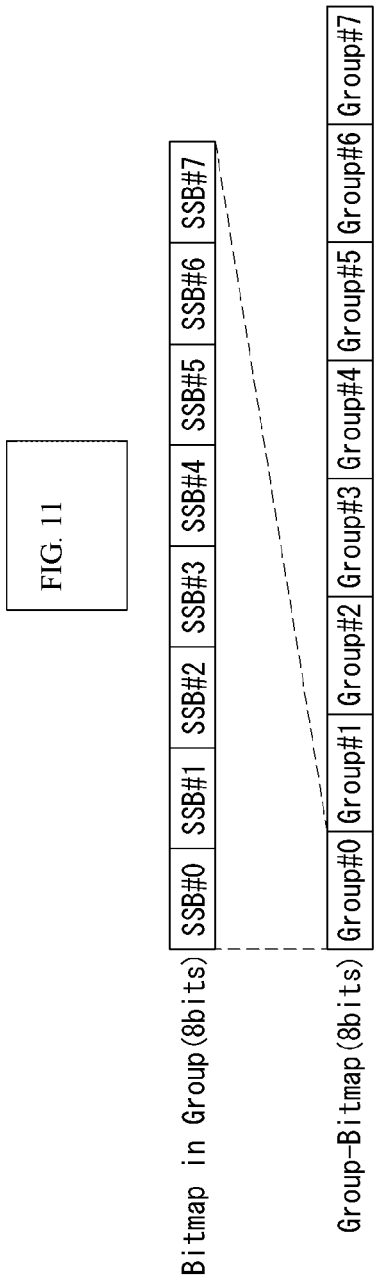
FIG. 11 illustrates a method for informing SSB (SSB_tx) which is actually transmitted.

FIG. 11 illustrates a method for informing SSB (SSB_tx) which is actually transmitted.

In the SSB burst set, up to L SSBs may be transmitted and the numbers/positions of SSB which are actually transmitted may vary for each eNB/cell. The number/positions of SSBs which are actually transmitted are used for rate-matching and measurement and information on the actually transmitted SSB is indicated as follows.

In case related to rate-matching: The information may be indicated through UE-specific RRC signaling or RMSI. The UE-specific RRC signaling includes a full (e.g., length L) bitmap in both below 6 GHz and above 6 GHz frequency ranges. Meanwhile, the RMSI includes the full bitmap below 6 GHz and a compression type bitmap as illustrated in FIG. 11 above 6 GHz. Specifically, the information on the actually transmitted SSB may be indicated by using group-bitmap (8 bits)+in-group bitmap (8 bits). Herein, a resource (e.g., RE) indicated through the UE-specific RRC signaling or RMSI may be reserved for SSB transmission and the PDSCH/PUSCH may be rate-matched by considering SSB resources.

In case related to measurement: When the network is in an RRC connected mode, the network (e.g., eNB) may indicate an SSB set to be measured in a measurement interval. The SSB set may be indicated for each frequency layer. When there is no indication for the SSB set, a default SSB set is used. The default SSB set includes all SSBs in the measurement interval. The SSB set may be indicated by using the full (e.g., length L) bitmap of the RRC signaling. When the network is in an RRC idle, the default SSB set is used.

Discontinuous Reception (DRX) Operation

The UE may perform the DRX operation while performing the procedures and/or methods described/proposed above. A UE in which the DRX is configured discontinuously receives a DL signal to reduce power consumption.

The DRX may be performed in a Radio Resource Control (RRC)_IDLE state, an RRC_INACTIVE state, and an RRC_CONNECTED state. In the RRC_IDLE state and the RRC_INACTIVE state, the DRX is used for discontinuously receiving a paging signal. Hereinafter, the DRX performed in the RRC_CONNECTED state will be described (RRC_CONNECTED DRX).

Figure 12:
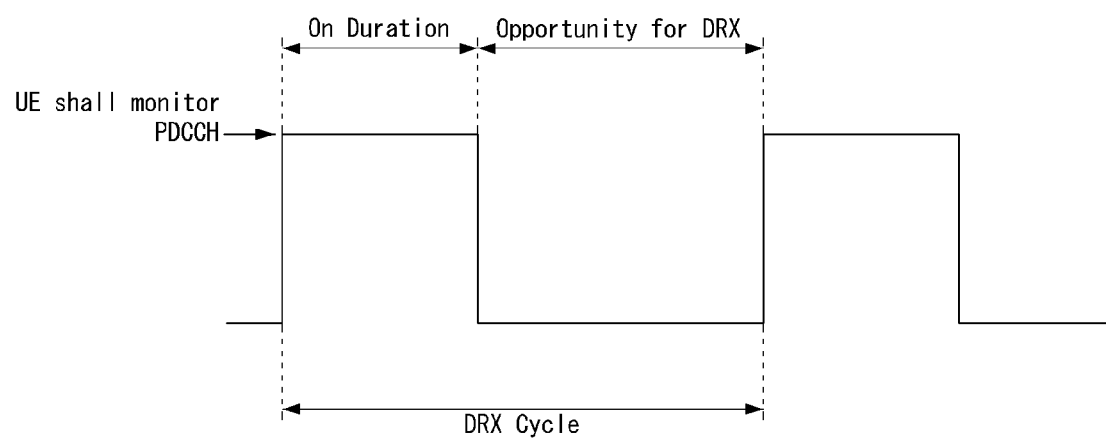
FIG. 12 illustrates a DRX cycle.

FIG. 12 illustrates a DRX cycle (RRC_CONNECTED state).

Referring to FIG. 12, the DRX cycle is constituted by On Duration and Opportunity for DRX. The DRX cycle defines a time interval in which the On Duration is periodically repeated. The On Duration represents a time interval which the UE monitors in order to receive the PDCCH. When the DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring the PDCCH, the UE enters a sleep state after the On Duration ends. Accordingly, when the DRX is configured, PDCCH monitoring/reception may be discontinuously performed in the time domain in performing the procedure and/or method described/proposed above. When the DRX is configured, a PDCCH reception occasion (e.g., a slot having a PDCCH search space) may be discontinuously configured according to the DRX configuration in the present disclosure. On the contrary, when the DRX is not configured, the PDCCH monitoring/reception may be continuously performed in the time domain in performing the procedure and/or method described/proposed above. For example, when the DRX is not configured, the PDCCH reception occasion (e.g., the slot having the PDCCH search space) may be continuously configured. Meanwhile, regardless of whether the DRX is configured, the PDCCH monitoring may be limited in a time interval configured as a measurement gap.

Table 7. shows a process of the UE related to the DRX (RRC_CONNECTED state). Referring to Table U1, DRX configuration information is received through higher layer (e.g., RRC) signaling and whether the DRX is on/off is controlled by a DRX command of an MAC layer. When the DRX is configured, the UE may discontinuously monitor the PDCCH in performing the procedure and/or method described/proposed in the present disclosure.

TABLE 7

| | Type of signals | UE procedure |
|---|---|---|
| 1st step | RRC signaling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Here, MAC-CellGroupConfig includes configuration information required for configuring a Medium Access Control (MAC) parameter for a cell group. MAC-CellGroupConfig may include even configuration information for the DRX. For example, MAC-CellGroupConfig may include information as follows in defining the DRX.

Value of drx-OnDurationTimer: Defining the length of the start interval of the DRX cycle Value of drx-InactivityTimer: Defining the length of a time interval in which the UE is in an awake state after the PDCCH occasion in which a PDCCH indicating initial UL or DL data is detected Value of drx-HARQ-RTT-TimerDL: Defining the length of a maximum time interval until DL retransmission is received after DL initial transmission is received Value of drx-HARQ-RTT-TimerDL: Defining the length of a maximum time interval until a grant for UL retransmission is received after the grant for UL initial transmission is received drx-LongCycleStartOffset: Defining a time length and a start point of the DRX cycle drx-ShortCycle (optional): Defining a time length of a short DRX cycle Here, when even any one of drx-OnDurationTimer, drx-InactivityTimer, drx-HARQ-RTT-TimerDL, and drx-HARQ-RTT-TimerDL is operating, the UE monitors the PDCCH every PDCCH occasion while maintaining the awake state.

The contents (NR system, frame structure, etc.) described above may be applied in combination with methods proposed in the present disclosure to be described below or may be supplemented to clarify technical features of the methods proposed in the present disclosure.

The expression of 'A/B' used in the present disclosure may be construed as the same meaning as A and/or B and at least one of A or B.

Several sequences having a specific length may be predefined. This may be used for transmission of uplink and/or downlink data signal/control signal/reference signal. The predefined sequence may be defined (or determined) according to several criteria including Peak-to-Average Power Ratio (PAPR) characteristics, auto-correlation characteristics, and the like.

The present disclosure proposes a method for designing a length-N (the length of the sequence is N) in which each element of the sequence is constituted by symbols such as M-Phase Shift Keying (PSK), M-Quadrature Amplitude Modulation (QAM), etc.

When a Frequency Domain Spectrum Shaping (FDSS) filter is used, it is generally known that the PAPR performance is enhanced. As an example therefor, FIG. 7 may be illustrated. For this reason, schemes are proposed, which consider the FDSS filter together in order to design a sequence constituted by pi/2 BPSK modulation symbols and a sequence constituted by M-PSK symbols.

Figure 13:
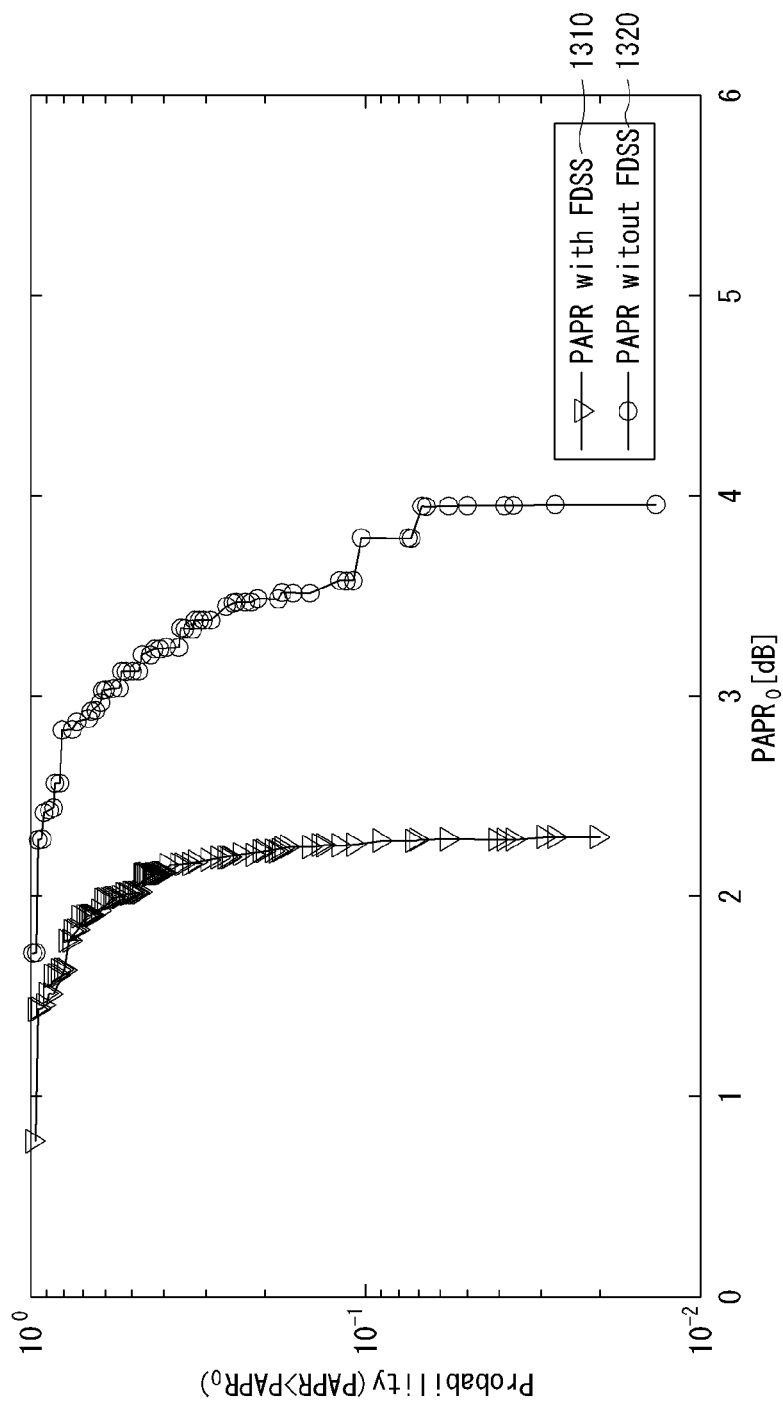
FIG. 13 is a diagram illustrating PAPR performance of many sequences for a case where an FDSS filter is used and a case where the FDSS filter is not used.

FIG. 13 is a diagram illustrating PAPR performance of many sequences for a case where an FDSS filter is used and a case where the FDSS filter is not used.

In FIG. 13, the FDSS filter corresponds to a time domain response of [0.28 1 0.28]. Here, [0.28 1 0.28] indicates that a side of a high center filter is cut off in the frequency domain.

In FIG. 13, reference numeral 710 represents PAPR performance of a sequence using FDSS and reference numeral 720 represents PAPR performance of a sequence not using the FDSS.

When PAPR performance for a large number of sequences is viewed, it can be seen that the PAPR performance is enhanced in the case of using the FDSS filter.

For example, the FDSS corresponds to a time domain response of [0.28, 0.28, 1.00].

However, when the PAPR performance is viewed from the viewpoint of a specific one sequence, an optimal FDSS filter for minimizing the PAPR may vary for each sequence. However, when a different filter is used for each sequence, problems such as computation complexity and/or unnecessary implementation complexity of the eNB and the UE may occur. Further, the used filter may vary depending on UE and eNB implementation and the FDSS may not be used due to an increase in complexity or an increase in block error rate (BLER) depending on the use of the FDSS.

Accordingly, the present disclosure proposes a method for configuring (or defining) a sequence set by considering both a case of using the FDSS filter and a case of not using the FDSS filter when a length-N sequence set constituted by M-PSK or M-QAM symbols is configured (or defined or used).

Hereinafter, methods (or proposals) proposed in the present disclosure may be applied to waveform (CP-OFDM (or transform precoding disabled) and DFT-s-OFDM (transform precoding enabled)) used for DL transmission and/or UL transmission, respectively. In this regard, the UE may receive, from the eNB, information on a waveform to which the following proposed methods are to be applied through the RRC signaling.

In other words, the RRC signaling may include information on a type of waveform to be used for the DL transmission and/or UL transmission. In addition, the RRC signaling may be a configuration IE form of a reference signal (RS) to which a sequence generating method proposed below may be applied.

When the information indicating the type of waveform is included as the RS configuration IE form, the information may include fields (or parameters or information) shown in tables below.

Table 8 shows one example of a case where CP-OFDM is applied.

TABLE 8 transformPrecodingdisabled
RS related parameters for CP-OFDM

Table 9 shows one example of a case where DFT-s-OFDM is applied.

TABLE 9 transformPrecodingEnabled
RS related parameters for DFT-s-OFDM

The transform precoding may be used as an expression such as transformer precoder.

Further, equations and values related to pseudo-random sequence(c(i)) described below may be used for generation of the sequence and determination of an initialization value of the sequence proposed below.

Normal pseudo-random sequences are defined by a length-31 gold sequence. An output sequence c(n) having a length of $M_{PN}$ is defined by Equation 6 below. Here, n=0,1, ..., $M_{PN}$-1.

$c(n)=(x_1(n+N_c)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 6]

Here, $N_c$=1600 and a first m-sequence $x_1(n)$ will be initialized to $x_1(0)$=1, $x_1(n)$=0, n=1, 2, ..., 30

Initialization of a second m-sequence $x_2(n)$ is described by $c_{init}=\sum_{i=0}^{30} x_2(i)\cdot 2^i$ having a value depending on application of the sequence.

(Method 1)

K (>0) sequences (a set of K sequences) in which the length of the sequence is N (>0) and each element of the sequence is constituted by M-QAM symbols may be designed (or generated or defined) according to a rule (or condition) presented below. Here, since the sequence has a length of N, the total number of sequences which may be considered is $M^N$. In other words, it may be regarded that a rule (or condition) of selecting (or choosing) a total of K(K≤$M^N$) sequences among a total of $M^N$ available sequences is proposed.

① Among a total of $M^N$ sequences, K sequences may be chosen (or determined) to have a cross-correlation characteristic of a specific threshold or a specific level or less with each other.

② Among a total of $M^N$ sequences, K sequences having a low auto correlation characteristic of a specific threshold or a specific level or less with each other may be chosen (or determined). The auto-correlation value may be for a specific correlation lag and K sequences may be chosen (or determined) by considering a threshold for an auto-correlation value for one or more correlation lags.

③ Among a total of $M^N$ sequences, K sequences having a low cyclic shift auto-correlation characteristic of a specific threshold or specific level or less may be chosen (or determined). As a more specific example, K sequences may be chosen in which a correlation between cyclic shift and not cyclic shift of +L, +L−1, +L−2, ..., −L+1, and/or −L elements in the length-N sequence is low. The L is equal to or smaller than N −1.

In other words, when an n-th specific sequence is defined as $x_u(n)$, sequences in which a value of Equation 7 below is small may be chosen.

$$\sum_{0\leq n\leq 11} x_u(n)x_u^*((n+d)\bmod N), \quad \text{[Equation 7]}$$

where $d = -L, -L+1, ..., L-1, L$

④ Among K chosen sequences, all available cyclic shifted forms of a specific length-N sequence may be regarded as the same sequence. Accordingly, among K chosen sequences, no specific sequence is the same as an available cyclic shifted form of another sequence.

⑤ Among a total of $M^N$ sequences, when a specific FDSS filter is applied to K sequences, the sequence may be chosen (or determined or defined) so as to show a low PAPR characteristic of a specific threshold or specific level (e.g., X (>0) dB) or less.

For example, the FDSS filter may be an FDSS filter corresponding to the time domain response [0.28 1 0.28].

Additionally, it may be considered that two or more multiple FDSS filters are used. Since the PAPR performance shown when applying each FDSS filter varies depending on the specific sequence, multiple FDSS filters may be used by considering that the PAPR performance shown when applying each FDSS filter varies depending on the specific sequence.

⑥ Among a total of $M^N$ sequences, the sequence may be chosen (or determined or defined) so as to show a low PAPR characteristic of a specific threshold or specific level (e.g., Y(>0) dB) or less even though the FDSS filter is not used in K sequences.

⑦ Sequences of a form in which the same phase is multiplied for each sequence element in a specific length-N sequence are regarded as the same sequence without being considered as different sequences.

The reason is that when a sequence of a form in which only the phase is shifted is used, a problem occurs in distinguishing the sequence, such as whether the phase is shifted due to the channel, so it is difficult to use different sequences.

Method 1 above may be applied to a specific antenna port (e.g., specific Reference Signal (RS) antenna port) and the same rule may be applied to multiple antenna ports. Alternatively, some or all rules among the rules may be applied (or used) for each antenna by considering characteristics for each antenna port.

By considering all of the rules, a sequence may be chosen (or determined or used), which satisfies all conditions presented above and K sequences may be chosen by considering at least one of the rules.

For example, among a total of $M^N$ sequences, K sequences are chosen, which show PAPR performance of a specific level/threshold (e.g., X dB) or less when applying the FDSS filter and shows PAPR performance of a specific level/threshold (e.g., Y dB) or less even when not applying the FDSS filter to be defined (or chosen) as one sequence set.

The sequence and/or sequence set may be used for transmitting the reference and/or data by the UE/eNB.

In addition to the sequences chosen according to a condition depending on whether to apply the FDSS filter (assuming that the number of chosen sequences is K or more), K sequences having a low auto-correlation and/or cyclic-auto correlation of a specific level or less are additionally chosen to be determined as one sequence set.

K chosen sequences may be defined (or determined) as one sequence set and used by the UE and the eNB and the eNB may indicate/configure to the UE which sequence the UE is to use at a specific time. For reference, the M-PSK and M-QAM symbols mean a Phase shift keying modulation symbol in which a modulation order is M and a Quadrature Amplitude modulation symbol in which the modulator order is M.

Figure 14:
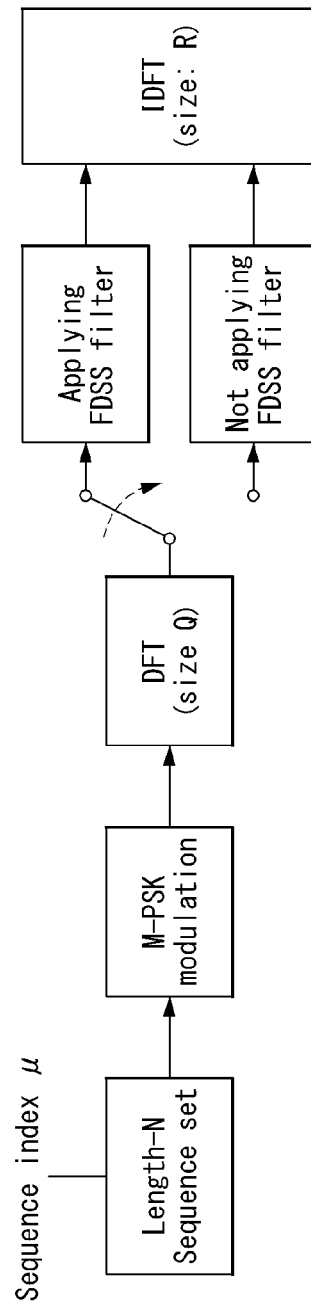
FIG. 14 illustrates one example of a system model and/or a procedure for a DFT-s-OFDM based system.

FIG. 14 illustrates one example of a system model and/or a procedure for a DFT-s-OFDM based system.

As an application example of Method 1 above, a CP-OFDM based system and a DFT-s-OFDM based system may be considered. FIG. 14 above illustrates a procedure (or process) which may be required when Method 1 is applied to the DFT-s-OFDM based system.

In FIG. 14 above, a length-N sequence set may be configured in various forms including a sequence set configured by an integer index, a sequence set configured by binary information, and the like. Further, the FDSS may not be used due to a transmitter (UE or eNB) implementation complexity problem or a problem such as an increase in signal transmission error which is caused by using the FDSS filter. By reflecting this, the case of not applying the FDSS and a case of applying the FDSS are separately illustrated in FIG. 8. Further, this may be selectively applied thereto. Although not illustrated in FIG. 14 above, only one of the case of using the FDSS filter and the case of not using the FDSS filter may be implemented according to implementation of the transmitter and the proposed scheme may be still usefully used even for the transmitter.

By the above proposed scheme, it is advantageous in that the sequence may be defined (or designed or chosen) and used by considering various implementation schemes of the transmitter.

(Method 1-1)

When K proposed sequences are used throughout multiple OFDM symbols in the same slot, the characteristics such as the cross-correlation/auto-correlation among K sequences need to be considered.

In two concatenated OFDM symbols, among K sequences, when two sequences are used by using one sequence per symbol, a sequence first used among K sequences and a sequence having a smallest cross-correlation may be used in a next symbol. To this end, a specific sequence and the sequence having the smallest cross-correlation may be defined (or determined or configured) as one pair. In other words, a specific sequence index u and a sequence index u' having the smallest cross-correlation may be defined (or configured) as a pair. One example of the one pair may be (u,u').

Additionally, in Method 1 above, the sequence may be chosen or found while one or all of six rules ①, ②, ③, ④, ⑤, and ⑥ mentioned as the rule (or condition) of selecting (or choosing) the sequence according to K(K≤$M^N$) which is a total number value of choosing the sequence. For example, it is assumed that the number of chosen sequences is 100 (i.e., if one sequence set is constituted by 100 sequences) and it is assumed that a sequence of satisfying all of the six conditions (or rules) is found. In this case, a maximum allowed cross-correlation value, a cyclic auto-correlation value, and maximum allowable PAPR values when applying the filter may be configured to specific values and when the sequence is chosen, the number of available sequences may exceed 100.

Accordingly, the number of sequences to be found may be found while fixing the number of sequences to be found and changing the conditions to stronger constraints.

Figure 15:
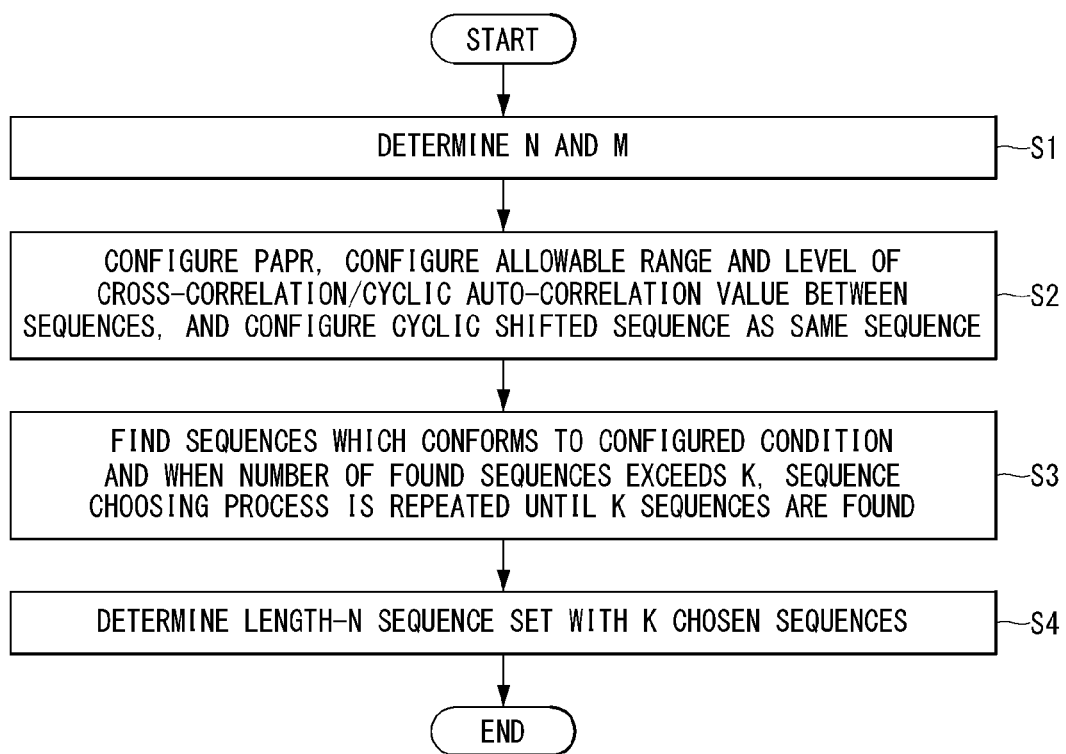
FIG. 15 is a diagram illustrating a flowchart of Method 1 proposed in the present disclosure.

With respect to Method 1 above, a flowchart for a proposed scheme (or algorithm) may be illustrated as shown in FIG. 15. Further, respective steps of the flowchart may be simultaneously performed or independently performed. Alternatively, an order of the respective steps may be partially changed.

FIG. 15 is a diagram illustrating a flowchart of Method 1 proposed in the present disclosure.

In FIG. 15, first, the transmitter (UE or eNB) determines N and M in order to find K (>1) sequences in which the length of each sequence is N (>1) and each element constituting the sequence is the M-PSK/M-QAM symbol (S1).

Thereafter, the transmitter 1) configures a PAPR value to be allowed when using a specific FDSS filter and a PAPR value to be allowed when not using the FDSS filter, 2) configures an allowed range/level of the cross-correlation and cyclic auto-correlation values between the sequences, and 3) configures the cyclic shifted sequence to be regarded as the same sequence, in order to determine characteristics of K sequences to be found (S2).

Thereafter, the transmitter finds a sequence that satisfies a predetermined condition by using the configured values (S3). Here, the transmitter repeats a process of choosing the sequence by changing one or more criteria among the configured conditions until K sequences are found when the number of found sequences exceeds K. Here, if K sequences are not accurately generated, K sequences may be excluded and discarded.

Thereafter, the transmitter configures or determines a length-N sequence set with the K chosen sequences (S4).

As a concrete example of the method, 30 sequences (sequence set) in which the sequence length is 6 and each element constituting the sequence is configured by 8-PSK symbols may be defined. In other words, in FIG. 14, a case where N=6 and M=8 may be considered.

(Method 2)

Method 2 proposes that all sequences presented in Table 10 are used, in which each sequence element is constituted by 8-(Phase Shift Keying (PSK) symbols and the length is 6 or some of the sequences presented in Table 10 are to be used as uplink PUSCH and/or PUCCH DMRS sequences. The proposed sequences may be used for Discrete Fourier Transform Spread Orthogonal Frequency Division Multiplexing (DFT-S-OFDM) and/or Cyclic Prefix OFDM (CP-OFDM). In this case, since N=6 and M=8, the total number of sequences which may be considered is $8^6$. A rule of generating/choosing/using K (>0) some sequences among a total of $8^6$ sequences is as follows. In the proposal, K=30 is assumed.

A main feature of the proposed sequence is that a low PAPR characteristic of X(>0) dB or less is shown when the FDSS filter (FDSS filter in which the time-domain response is [0.28 1 0.28]) is applied and a low PAPR characteristic of Y(>0) dB is shown even when the FDSS filter is not applied. More specifically, the proposed sequence has the following characteristics. In other words, it is proposed that the UE/eNB is to use a sequence that satisfies the following characteristics/conditions.

- It is characterized in that when the FDSS filter (FDSS filter in which the time-domain response is [0.28 1 0.28]) is applied, the PAPR is equal to or lower than approximately 2.1 [dB].
- When the FDSS filter is not used, a sequence may be chosen and used, in which the PAPR is equal to or lower than approximately 2.5 [dB].
- It is characterized in that the maximum cyclic auto-correlation is low (equal to or smaller than approximately 0.2357) in +1 and −1 cyclic auto-correlation.
- It is characterized in that the maximum cyclic auto-correlation is low (equal to or smaller than approximately 0.4714) in +2, +1, −1, and −2 cyclic auto-correlation.
- It is characterized in that the maximum cyclic auto-correlation is low (equal to or smaller than approximately 0.80474) in +3, +2, +1, −1, −2, and −3 cyclic auto-correlation.
- Among K chosen sequences, all available cyclic shifted forms of a specific length-N sequence may be regarded as the same sequence. Accordingly, among K chosen sequences, no specific sequence is the same as an available cyclic shifted form of another sequence.

In other words, for example, sequence #1 of Table 10 is '−7 −5 −1 5 1 −5' and '−5 −1 5 1 −5 −7' which is a cyclic shift version thereof is the same sequence.

TABLE 10

| index u | Sequences $\phi_u^{(n)}$ | PAPR [dB] under FDSS filter [0.28 1.0 0.28] | PAPR [dB] without FDSS filter |
|---|---|---|---|
| 1 | −7 1 −1 −7 3 7 | 2.1081 | 2.4678 |
| 2 | −7 1 5 3 5 −3 | 2.0883 | 2.8683 |
| 3 | −7 −5 −1 5 1 −5 | 1.9058 | 2.4184 |
| 4 | −7 −5 3 −1 7 −5 | 2.0883 | 2.8683 |
| 5 | −7 7 1 −3 3 7 | 1.9058 | 2.4184 |
| 6 | −7 −3 −7 3 1 5 | 1.9850 | 2.2841 |
| 7 | −7 −1 −5 5 3 5 | 1.9133 | 2.5031 |
| 8 | −7 −3 −1 −3 7 3 | 1.9133 | 2.5031 |
| 9 | −7 −3 1 −3 −5 −1 | 1.7809 | 2.8344 |
| 10 | −7 −3 1 −3 7 5 | 1.9675 | 2.3452 |
| 11 | −7 −3 1 −1 −7 5 | 1.9850 | 2.2841 |

TABLE 10-continued

| index u | Sequences $\phi_u^{(n)}$ | PAPR [dB] under FDSS filter [0.28 1.0 0.28] | PAPR [dB] without FDSS filter |
|---|---|---|---|
| 12 | −7 −3 1 5 1 −5 | 1.9558 | 2.3581 |
| 13 | −7 −3 1 5 3 −3 | 1.9558 | 2.3581 |
| 14 | −7 −1 3 1 3 −3 | 1.9941 | 2.8754 |
| 15 | −7 −1 3 5 3 −3 | 1.9058 | 2.4184 |
| 16 | −7 3 −1 3 7 −5 | 1.9850 | 2.2841 |
| 17 | −7 3 −1 5 −7 −5 | 1.9133 | 2.5031 |
| 18 | −7 3 1 3 7 −3 | 1.9091 | 2.5047 |
| 19 | −7 3 7 5 1 5 | 1.7809 | 2.8344 |
| 20 | −7 5 −7 −3 7 −5 | 1.7809 | 2.8344 |
| 21 | −7 5 −5 −1 1 −1 | 1.9091 | 2.5047 |
| 22 | −7 5 −3 −1 −3 1 | 2.0883 | 2.8683 |
| 23 | −7 5 −1 −3 −1 3 | 1.9058 | 2.4184 |
| 24 | −7 5 −1 −3 1 5 | 1.9558 | 2.3581 |
| 25 | −7 5 −1 1 −1 3 | 1.9941 | 2.8754 |
| 26 | −7 7 −7 −3 3 −1 | 1.9133 | 2.5031 |
| 27 | −7 7 −5 −1 3 −1 | 1.9850 | 2.2841 |
| 28 | −7 7 −5 1 −3 7 | 1.9941 | 2.8754 |
| 29 | −7 7 −5 3 −1 7 | 2.0883 | 2.8683 |
| 30 | −7 7 −5 5 −7 −3 | 1.7809 | 2.8344 |
| 31 | −7 −5 −7 −3 5 1 | 2.1099 | 2.8312 |
| 32 | −7 −5 −1 −7 3 1 | 2.1081 | 2.4678 |
| 33 | −7 −5 3 1 −5 5 | 2.1140 | 2.4372 |
| 34 | −7 −3 −5 −3 5 1 | 2.1099 | 2.8312 |
| 35 | −7 −3 7 1 −1 7 | 2.1140 | 2.4372 |
| 36 | −7 1 −3 5 −7 7 | 2.1099 | 2.8312 |
| 37 | −7 3 −3 1 3 −5 | 2.1140 | 2.4372 |
| 38 | −7 7 −1 1 5 −1 | 2.1140 | 2.4372 |

In $\phi_u(n)$ of Table 10, u represents the index of the sequence and n represents the element of the sequence (or index of the element). For example, when the length of the sequence is 6, n has 0, 1, 2, 3, 4, and 5 as shown in Table 10.

In Table 10, for example, when the index u is 1, $\phi_1(0)$, $\phi_1(1)$, $\phi_1(2)$, $\phi_1(3)$, $\phi_1(4)$, and $\phi_1(5)$ and correspond to −7, 1, −1, −7, 3, and 7, respectively.

Table 10 above shows one example of an 8-PSK based sequence set (length-6) proposed in the present disclosure and the modulation symbols are generated by $s_u(n)=e^{j\Phi_u(n)\pi/8}$.

The PAPR performance is evaluated in DFT-s-OFDM having Comb-2 type DMRS for one RB (TS 38.211, TS 38.214, and TS 38.331 are referred to for Comb-2 type DMRS).

$$s_u(n) = e^{\frac{j\phi_u(n)\pi}{8}}.$$

The modulation symbols are generated by
u: Sequence index)
n: Element index of each sequence)
The applied FDSS filter corresponds to the time domain response of [0.28 1.0 0.28].
An IFFT size is 64 and a DFT size is 12.

Figure 16:
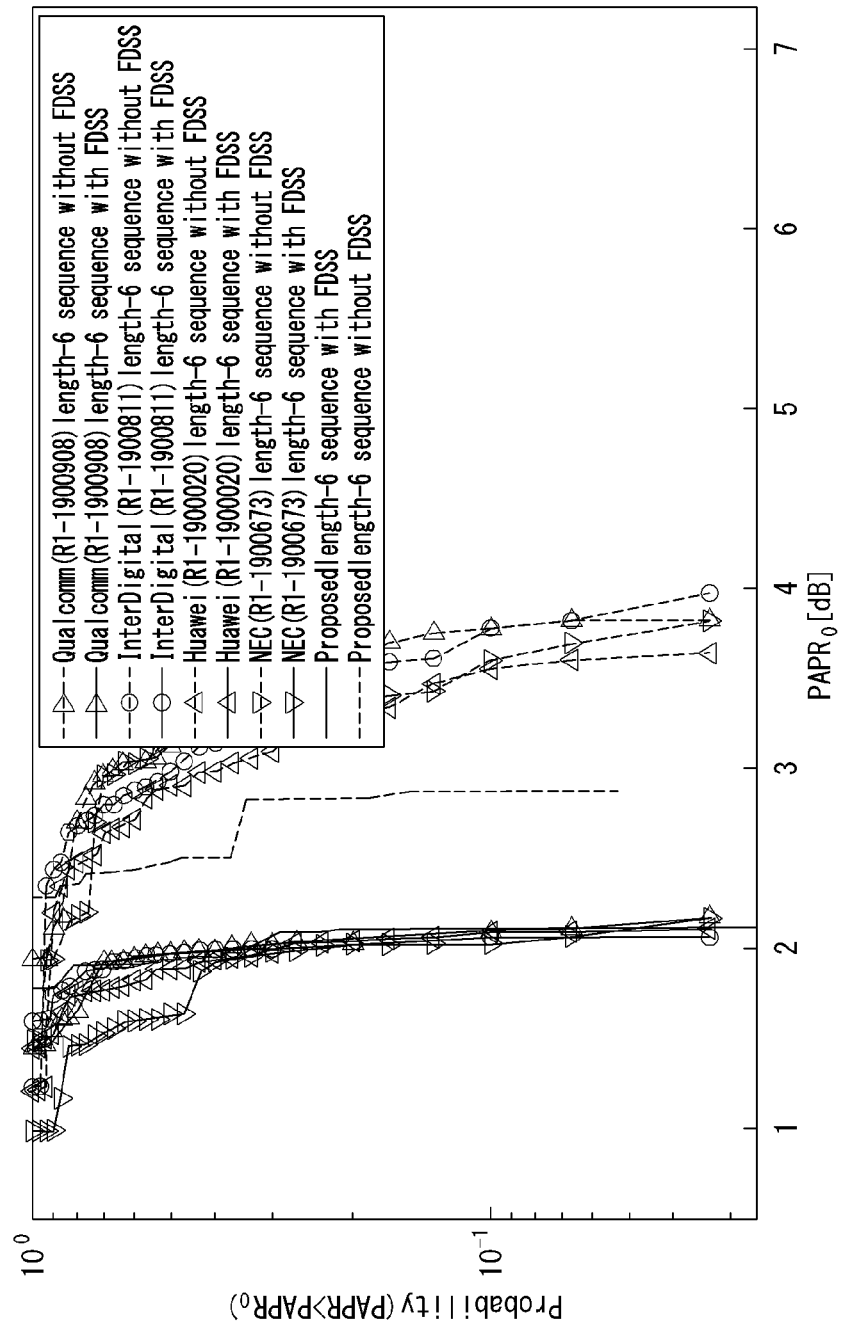
FIG. 16 illustrates PAPR performance for a proposed set of length-6 sequences in which elements of each sequence are constituted by 8-PSK symbols.

Excellence in terms of the PAPR performance of the length-6 8-PSK sequence presented in Table 10 above may be confirmed in FIG. 16. The PAPR performances of a total of 30 sequences corresponding to #1 to #30 among the sequences presented in Table 10 are shown. FIG. 16 above shows the PAPR performance when the sequence presented in Table 10 above is used as the Comb-2 DMRS sequence in the DFT-S-OFDM system.

The PAPR performance when applying the FDD filter (corresponding to the time-domain response of [0.28 1.0 0.28]) and the PAPR performance when not applying the FDSS filter for the presented sequence may be confirmed.

The PAPR performed is presented by distinguishing whether to apply the FDSS similarly even to the conventional presented length-6 8-PSK. Both the conventional scheme and the proposed scheme consider that one sequence set is constituted by 30 sequences and are a PAPR evaluation result therefor. Accordingly, a graph may not be presented with probability (PAPR >PAPR_0)=0.1 or less due to the lack of evaluation samples, but a difference in performance between individual sequences may be clearly confirmed. As the conventional presented length-6 8-PSK sequence, sequences presented in R1-1813445, R1-190081, R1-1900020, and R1-1900673 are referred to.

As illustrated in FIG. 16, the proposed sequence shows a performance similar to the PAPR characteristic shown by the conventional presented sequence when applying the FDSS filter. In particular, it can be seen that a fine but slightly better performance is shown in a region in which probability (PAPR >PAPR_0)=0.1 or less. When the FDSS filter is not applied, the PAPR performance deteriorates compared with the FDSS filter is applied, but a more excellent PAPR performance than the conventional presented sequence may be confirmed. In other words, it may be confirmed that in 30 proposed sequences, the PAPR does not exceed 2.5 dB even when the FDSS filter is not applied unlike the conventional presented sequence set (30 sequences are presented as one sequence set in respective references R1-1813445, R1-190081, R1-1900020, and R1-1900673).

FIG. 16 illustrates PAPR performance for a proposed set of length-6 sequences in which elements of each sequence are constituted by 8-PSK symbols.

The PAPR values presented in Table 10 and FIG. 16 above may be slightly different depending on the IFFT size and a tool for performing a simulation, but a large trend will be similar. Therefore, it may be considered that even if there is the slight difference, the slight difference does not deviate from the spirit of the method presented in the present disclosure and included in the method proposed in the present disclosure. Further, it should be considered that a sequence generating/choosing method which exceeds the auto-correlation threshold is also included in the spirit of the method proposed in the present disclosure if the sequence is chosen/used by considering whether to use the FDSS or not.

Method 2 above may primarily adopt FDSS filter (corresponding to time-domain response [0.28, 1.00, 0.28]), but may be considered as a sequence providing a comparable PAPR performance even when the FDSS filter is not used.

On the contrary, the sequence may be used so that the PAPR performance when the FDSS filter is not used is more excellent than the PAPR performance when a specific FDSS filter is used.

However, it is designed that even when the specific FDSS filter is used, the comparable PAPR performance may be shown. If there are many cases in which the FDSS filter is not used due to an increase in error rate, which is caused by distortion of an original transmission signal due to transmitter implementation complexity and/or the use of the FDSS filter, a sequence of a scheme proposed in Method 3 below may be usefully used.

(Method 2-2)

Method 2-2 relates to a method in which all sequences presented in Table 11 are used, in which each sequence element is constituted by 8-(Phase Shift Keying (PSK) symbols and the length is 6 or some of the sequences presented in Table 11 are used as uplink PUSCH and/or PUCCH DMRS sequences. The proposed sequences may be used for Discrete Fourier Transform Spread Orthogonal Frequency Division Multiplexing (DFT-S-OFDM) and/or Cyclic Prefix OFDM (CP-OFDM).

In the case of the method, since N=6 and M=8, the total number of sequences which may be considered is $8^6$. In this example, a total of two antenna ports (e.g., two DMRS antenna ports) are considered and each antenna port is subject to Frequency Division Multiplexing (FDM) in the form of Comb-2. A rule of generating/choosing/using K (>0) some sequences among a total of $8^6$ sequences is as follows. In the method, K=45 is assumed.

A main feature of the proposed sequence is that two antenna ports subject to FDM in the form of Comb-2 show a low PAPR characteristic of 2.1 dB or less when the FDSS filter (FDSS filter in which the time-domain response is [0.28 1 0.28]) is applied and a low PAPR characteristic of 2.3 dB even when the FDSS filter is not applied.

Additionally, the proposed sequence has the following characteristics.

The proposed sequence has a characteristic that the maximum cyclic auto-correlation is equal to or smaller than approximately 0.2357 in +1 and −1 cyclic auto-correlation lags.

The proposed sequence has a characteristic that the maximum cyclic auto-correlation is equal to or smaller than approximately 0.8 in +3, +2, +1, −1, −2, and −3 cyclic auto-correlation lags.

Among K chosen sequences, all available cyclic shifted forms of a specific length-N sequence may be regarded as the same sequence. Accordingly, among K chosen sequences, no specific sequence is the same as an available cyclic shifted form of another sequence.

In other words, for example, sequence #1 of Table 11 is '−7 −5 −1 5 1 −5' and '−5 −1 5 1 −5 −7' which is a cyclic shift version thereof is the same sequence.

TABLE 11

| index u | Sequences $\phi_u^{(n)}$ | PAPR [dB] under FDSS filter for the $1^{st}$ port | PAPR [dB] under FDSS filter for the $2^{nd}$ port | PAPR [dB] without FDSS filter for both ports |
|---|---|---|---|---|
| 1 | −7 −7 −5 1 −5 3 | 1.8602 | 2.0111 | 2.2792 |
| 2 | −7 −5 −5 1 −7 3 | 1.8544 | 2.0157 | 2.2830 |
| 3 | −7 −5 −1 −7 −5 5 | 1.5917 | 1.1343 | 1.8125 |
| 4 | −7 −3 −7 −3 5 1 | 1.1298 | 1.5228 | 1.6323 |
| 5 | −7 −3 −5 −1 5 1 | 1.5775 | 1.8365 | 2.1090 |
| 6 | −7 −3 −5 −1 7 1 | 1.8403 | 1.2296 | 1.4634 |
| 7 | −7 −3 −5 −1 7 3 | 1.5775 | 1.8365 | 2.1090 |
| 8 | −7 −3 1 −5 5 3 | 1.6229 | 1.8270 | 2.1422 |
| 9 | −7 −3 1 −5 7 3 | 1.3980 | 1.8686 | 1.4299 |
| 10 | −7 −3 1 −3 7 3 | 1.2715 | 1.8500 | 2.2025 |
| 11 | −7 −3 1 7 3 −1 | 1.4188 | 1.8577 | 1.3790 |
| 12 | −7 −1 −5 3 7 5 | 1.5775 | 1.8365 | 2.1090 |
| 13 | −7 −1 1 −7 3 1 | 1.9140 | 2.0557 | 1.9783 |
| 14 | −7 1 −5 1 3 3 | 1.8544 | 2.0157 | 2.2830 |
| 15 | −7 1 −3 1 5 1 | 1.8693 | 1.7879 | 2.0393 |
| 16 | −7 1 −3 3 7 5 | 1.5775 | 1.8365 | 2.1090 |
| 17 | −7 1 3 3 −3 3 | 2.0740 | 1.9021 | 2.0493 |
| 18 | −7 1 5 1 −3 1 | 1.8762 | 1.7764 | 1.9936 |
| 19 | −7 3 −5 −1 −3 1 | 1.8318 | 1.2377 | 1.4984 |
| 20 | −7 3 −5 1 1 3 | 1.8602 | 2.0111 | 2.2792 |
| 21 | −7 3 −3 −5 −1 3 | 1.9971 | 1.5769 | 1.7233 |
| 22 | −7 3 1 −7 −3 1 | 1.7805 | 1.5540 | 1.8564 |
| 23 | −7 3 1 −5 −1 3 | 1.9405 | 1.4918 | 2.0507 |
| 24 | −7 3 1 −5 1 3 | 1.8712 | 1.8673 | 1.1808 |
| 25 | −7 3 1 5 −1 3 | 1.7987 | 1.8941 | 2.2224 |
| 26 | −7 3 3 5 −3 3 | 2.0908 | 1.9001 | 2.0476 |
| 27 | −7 3 5 −1 3 5 | 1.5780 | 1.1347 | 1.8558 |
| 28 | −7 3 5 7 1 −3 | 1.6121 | 1.9126 | 1.2472 |

TABLE 11-continued

| index u | Sequences $\phi_u{}^{(n)}$ | PAPR [dB] under FDSS filter for the 1st port | PAPR [dB] under FDSS filter for the 2nd port | PAPR [dB] without FDSS filter for both ports |
|---|---|---|---|---|
| 29 | −7 5 −7 −3 3 −1 | 1.2715 | 1.8500 | 2.2025 |
| 30 | −7 5 −5 −3 3 −1 | 1.4544 | 2.0850 | 1.7632 |
| 31 | −7 5 −5 −1 −3 1 | 1.5769 | 1.8271 | 2.1872 |
| 32 | −7 5 −5 −1 3 −1 | 1.3007 | 1.8495 | 2.2771 |
| 33 | −7 5 −3 1 −3 1 | 1.1521 | 1.5386 | 1.6826 |
| 34 | −7 5 −3 1 −1 3 | 1.5886 | 1.8200 | 2.1604 |
| 35 | −7 5 −1 −5 −1 3 | 1.3064 | 1.8552 | 2.2758 |
| 36 | −7 5 −1 1 3 −3 | 1.6196 | 1.9058 | 1.2817 |
| 37 | −7 5 1 −7 −3 1 | 1.6825 | 1.7349 | 1.5684 |
| 38 | −7 5 1 −5 −1 3 | 1.4188 | 1.8577 | 1.3790 |
| 39 | −7 5 1 5 −7 −1 | 2.0376 | 1.7490 | 1.8846 |
| 40 | −7 5 1 7 −5 −1 | 1.3980 | 1.8686 | 1.4299 |
| 41 | −7 7 −5 1 −3 5 | 1.5886 | 1.8200 | 2.1604 |
| 42 | −7 7 −5 3 −1 5 | 1.5769 | 1.8271 | 2.1872 |
| 43 | −7 7 1 −7 −5 1 | 1.9270 | 2.0557 | 1.9546 |
| 44 | −7 7 1 −7 −3 1 | 1.7795 | 1.5824 | 1.8210 |
| 45 | −7 7 1 −5 −1 3 | 1.6275 | 1.8289 | 2.0924 |

Table 11 shows one example of an 8-PSK based sequence set (length-6) proposed in the present disclosure. Here, the modulation symbols are generated by $s_u(n)=e^{j\Phi_u(n)\pi/8}$. The PAPR performance is evaluated in DFT-s-OFDM having Comb-2 type DMRS for one RB (TS 38.211, TS 38.214, and TS 38.331 are referred to for Comb-2 type DMRS).

The modulation symbols are generated by $s_u(n)=e^{j\Phi_u(n)\pi/8}$.
u: Sequence index)
n: Element index of each sequence).
The applied FDSS filter corresponds to a time domain response of [0.28 1.0 0.28].
An IFFT size is 64 and a DFT size is 12.

It is proposed that some or all of the sequences presented in Table 11 above are used. Further, some or all of the sequences presented in Table 11 above and sequences (having different characteristics) not presented in the above table and one sequence set may be constituted and used. It may be considered that such a constitution as an extension (or application) of the present disclosure is included in the spirit of the method proposed in the present disclosure.

Figure 17:
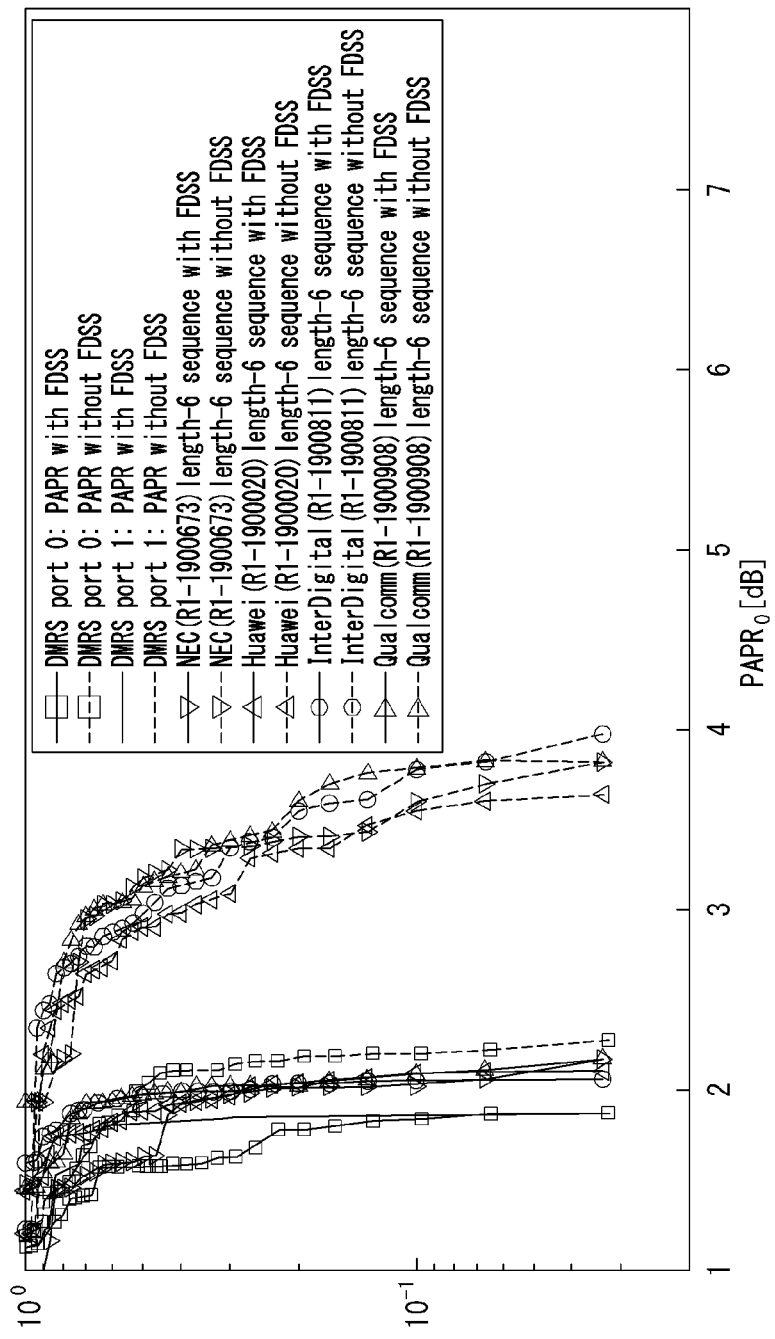
FIG. 17 illustrates PAPR performance for a proposed set of length-6 sequences in which elements of each sequence are constituted by 8-PSK symbols.

In FIG. 17, the excellence of the sequence proposed in Method 2-2 above may be confirmed. Compared with the conventional sequence, the proposed sequence shows the low PAPR characteristic in both the case of using the FDSS filter and the case of not using the FDSS filter. In particular, in the case of not using the FDSS filter, a difference in PAPR performance between the sequence presented in Method 2-2 and the conventional sequence is significantly large.

FIG. 17 illustrates PAPR performance for a proposed set of length-6 sequences in which elements of each sequence are constituted by 8-PSK symbols.

In Methods 2 and 2-1 above, a length-6 DMRS sequence (Pre-DFT length-6 sequence) is mapped to a time-frequency resource element (RE) by the following scheme.

It is characterized in that when frequency-RE is used as Comb-2 type in the frequency domain, a time-axis signal is shown repeatedly twice. Accordingly, in order to transmit the length-6 DMRS sequence in a step before DFT in the DFT-spread-OFDM system, the length-6 sequence needs to be used by considering that the length-6 sequence is repeated twice in the time domain. Accordingly, in a (pre-) DFT procedure, the length-6 sequence should be used to be repeated twice.

$$x_{2N} = D_{DFT}\begin{bmatrix} s_N \\ s_N \end{bmatrix} \quad \text{[Equation 8]}$$

Here, $D_{DFT}$ represents a Discrete Fourier Transform (DFT) matrix.

$s_N=[s1, s2, \ldots, s6]$ represents a 6×1 vector (one length-6 sequence). Here, each element $S_i$ represents the M-PSK/M-QAM symbol.

$x_{2N}$ represents a 12×1 vector which is a frequency-domain signal after DFT processing of $$\begin{bmatrix} s_N \\ s_N \end{bmatrix}.$$

In this case, when the DMRS sequence is transmitted by the DFT-spread-OFDM scheme, a DFT computation is performed by using a form in which the length-6 sequence is repeated twice in the pre-DFT step as mentioned above at the time of transmitting a single-port DMRS.

When the number of DMRS ports is 2, a specific DMRS port may be configured in a comb-2 type in which a frequency offset is 0 and the other DMRS port may be configured in a comb-2 type in which the frequency offset is 1. In this case, when the length-6 sequence to be used in the second DMRS port and the length-6 sequence to be used in the first DMRS port are mapped to a frequency axis through a (pre-)DFT process as shown in Equation 8 above, both the length-6 sequences are allocated to a Comb-2 structure (comb-2 structure in which the frequency offset is 0) having frequency offset "0".

When the length-6 sequence to be used in the second DMRS port is mapped to the frequency axis through the (pre-)DFT process as shown in Equation 5 above, the length-6 sequence is allocated to the Comb-2 structure having frequency offset "0". The length-6 sequence is allocated according to Equation 9 below instead of Equation 8 in order to allocate the length-6 sequence to the Comb-2 structure having frequency offset "1" so as to prevent the first DMRS port and the RE from being overlapped with each other.

$$x_{2N} = KD_{DFT}\begin{bmatrix} s_N \\ s_N \end{bmatrix} \quad \text{[Equation 9]}$$

$$K = \begin{bmatrix} 0_{1\times 12} \\ 1\ 0\ 0\ 0\ 0\ 0\ 0\ 0\ 0\ 0\ 0\ 0 \\ 0_{1\times 12} \\ 0\ 0\ 1\ 0\ 0\ 0\ 0\ 0\ 0\ 0\ 0\ 0 \\ 0_{1\times 12} \\ 0\ 0\ 0\ 0\ 1\ 0\ 0\ 0\ 0\ 0\ 0\ 0 \\ 0_{1\times 12} \\ 0\ 0\ 0\ 0\ 0\ 0\ 1\ 0\ 0\ 0\ 0\ 0 \\ 0_{1\times 12} \\ 0\ 0\ 0\ 0\ 0\ 0\ 0\ 0\ 1\ 0\ 0\ 0 \\ 0_{1\times 12} \\ 0\ 0\ 0\ 0\ 0\ 0\ 0\ 0\ 0\ 0\ 1\ 0 \end{bmatrix}$$

In Equation 9 above, K is a 12×12 matrix and a matrix which allows elements allocated to an odd-numbered subcarrier resource element (RE) to be allocated to an even-numbered subcarrier RE.

(Method 3)

Method 3 relates to a method in which all sequences presented in Table 8 are used, in which each sequence element is constituted by 12-(Phase Shift Keying (PSK) symbols and the length is 6 or some of the sequences presented in Table 12 are used as uplink PUSCH and/or PUCCH DMRS sequences. The proposed sequences may be used for Discrete Fourier Transform Spread Orthogonal Frequency Division Multiplexing (DFT-s-OFDM) and/or Cyclic Prefix OFDM (CP-OFDM).

In the case of the method, since N=6 and M=8, the total number of sequences which may be considered is $8^6$.

A rule of generating (or choosing or using) K (>0) some sequences among a total of $8^6$ sequences is as follows.

A main feature of the sequence proposed in the present disclosure is that the low PAPR characteristic of Y (>0) or less is shown when the FDSS filter is not used and the PAPR performance is less excellent when the FDSS filter (FDSS filter in which the time-domain response is [0.28 1 0.28]) than the PAPR performance when the FDSS filter is not used, but the low PAPR characteristic of X (>0) dB or less is still shown. More specifically, the proposed sequence has the following characteristics. In other words, it is proposed that the UE/eNB is to use a sequence that satisfies the following characteristics/conditions.

- It is characterized in that when the FDSS filter (FDSS filter in which the time-domain response is [0.28 1 0.28]) is applied, the PAPR is equal to or lower than approximately 2.8 [dB].
- When the FDSS filter is not used, a sequence may be chosen and used, in which the PAPR is equal to or lower than approximately 2.1 [dB].
- It is characterized in that the maximum cyclic auto-correlation is low (equal to or smaller than approximately 0.2357) in +1 and −1 cyclic auto-correlation.
- It is characterized in that the maximum cyclic auto-correlation is low (equal to or smaller than approximately 0.4714) in +2, +1, −1, and −2 cyclic auto-correlation.
- It is characterized in that the maximum cyclic auto-correlation is low (equal to or smaller than approximately 0.80474) in +3, +2, +1, −1, −2, and −3 cyclic auto-correlation.

Among K chosen sequences, all available cyclic shifted forms of a specific length-N sequence may be regarded as the same sequence. Accordingly, among K chosen sequences, no specific sequence is the same as an available cyclic shifted form of another sequence.

TABLE 12

| Sequence index u | Sequences $\phi_u^{(n)}$ | PAPR [dB] under FDSS filter [0.28 1.0 0.28] | PAPR [dB] without FDSS filter |
|---|---|---|---|
| 1 | −7 −7 −5 1 −5 5 | 2.2775 | 1.7169 |
| 2 | −7 −7 3 −7 −5 −1 | 2.5231 | 2.0790 |
| 3 | −7 −5 −7 3 −3 5 | 2.5217 | 1.9843 |
| 4 | −7 −5 −5 −3 5 1 | 2.5607 | 2.0547 |
| 5 | −7 −5 −5 −1 −7 3 | 2.2728 | 1.7325 |
| 6 | −7 −5 −1 7 1 −5 | 2.5422 | 2.0851 |
| 7 | −7 −5 1 −5 −7 5 | 2.7798 | 1.9549 |
| 8 | −7 −5 1 −5 −5 5 | 2.5223 | 2.0798 |
| 9 | −7 −5 3 −1 7 −7 | 2.5529 | 2.0873 |
| 10 | −7 −3 −7 7 1 7 | 2.7798 | 1.9549 |
| 11 | −7 −3 −3 −1 5 −1 | 2.2728 | 1.7325 |
| 12 | −7 −3 −1 −3 7 1 | 2.5370 | 2.0877 |
| 13 | −7 −3 −1 5 −1 −3 | 2.7821 | 1.8653 |
| 14 | −7 −3 −1 5 −1 −1 | 2.5344 | 1.9917 |

TABLE 12-continued

| Sequence index u | Sequences $\phi_u^{(n)}$ | PAPR [dB] under FDSS filter [0.28 1.0 0.28] | PAPR [dB] without FDSS filter |
|---|---|---|---|
| 15 | −7 −3 5 −1 −7 7 | 2.5217 | 1.9843 |
| 16 | −7 −3 7 1 7 −7 | 2.2775 | 1.7169 |
| 17 | −7 −3 7 7 1 7 | 2.5223 | 2.0798 |
| 18 | −7 −1 −7 −7 3 7 | 2.5231 | 2.0790 |
| 19 | −7 −1 −7 3 7 7 | 2.2728 | 1.7325 |
| 20 | −7 −1 1 1 5 −1 | 2.2775 | 1.7169 |
| 21 | −7 −1 1 5 −1 −1 | 2.5344 | 1.9917 |
| 22 | −7 −1 1 5 1 −1 | 2.7821 | 1.8653 |
| 23 | −7 1 −5 5 3 5 | 2.5370 | 2.0877 |
| 24 | −7 1 −3 5 7 7 | 2.5607 | 2.0547 |
| 25 | −7 1 3 3 5 −3 | 2.5529 | 2.0873 |
| 26 | −7 1 5 7 5 −1 | 2.5422 | 2.0851 |
| 27 | −7 3 −7 −5 −1 −5 | 2.7798 | 1.9549 |
| 28 | −7 3 −5 −1 1 −1 | 2.5217 | 1.9843 |
| 29 | −7 3 −3 −5 −3 1 | 2.5422 | 2.0851 |
| 30 | −7 3 −3 1 1 3 | 2.2775 | 1.7169 |
| 31 | −7 3 −3 3 5 5 | 2.2728 | 1.7325 |
| 32 | −7 3 1 −3 1 3 | 2.7821 | 1.8653 |
| 33 | −7 3 1 3 7 −1 | 2.5217 | 1.9843 |
| 34 | −7 3 3 −3 1 3 | 2.5344 | 1.9917 |
| 35 | −7 3 3 −3 3 5 | 2.5344 | 1.9917 |
| 36 | −7 5 −3 −1 −1 1 | 2.5529 | 2.0873 |
| 37 | −7 5 3 −3 3 5 | 2.7821 | 1.8653 |
| 38 | −7 7 1 −5 3 7 | 2.5422 | 2.0851 |
| 39 | −7 7 3 7 −7 −1 | 2.7798 | 1.9549 |

Table 12 shows one example of a proposed 8-PSK based sequence set (length-6). The modulation symbols are generated by $s_u(n)=e^{j\phi_u(n)\pi/8}$. The PAPR performance is evaluated in the DFT-s-OFDM system having the Comb-2 type DMRS for one RB.

Figure 18:
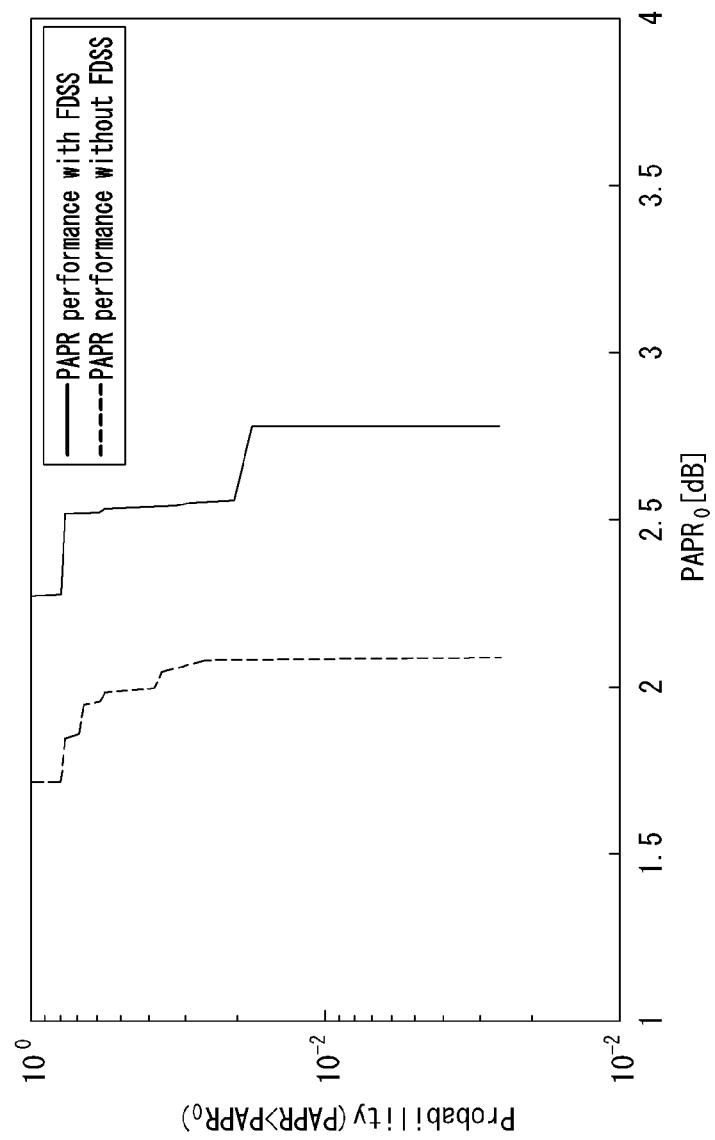
FIG. 18 illustrates PAPR performance for a proposed set of length-6 sequences in which elements of each sequence are constituted by 8-PSK symbols.

FIG. 18 illustrates PAPR performance for a proposed set of length-6 sequences in which elements of each sequence are constituted by 8-PSK symbols.

An advantage of the length-6 8-PSK sequence presented in Table 12 above may be seen in FIG. 18. FIG. 18 above illustrates the PAPR performance when the sequence presented in Table 12 above is used as the Comb-2 DMRS sequence in the DFT-S-OFDM system. The PAPR performance when applying the FDD filter (corresponding to the time-domain response of [0.28 1.0 0.28]) and the PAPR performance when not applying the FDSS filter for the presented sequence are shown. It may be confirmed that the sequence defined according to Method 3 above shows the PAPR performance of 2.1 dB or less when the FDSS filter is not used.

Methods 2 and 3 above relate to a method that uses a sequence which shows the low PAPR characteristic in a case of applying the FDSS filter (in particular, an FDSS filter in which the time-domain response corresponds to [0.28 1.00 0.28]) and in a case of not applying the FDSS filter, i.e., both cases with respect to the same specific sequence.

However, when the sequence having the low PAPR characteristic is determined (or used) by considering only the case where the FDSS filter is not used or the sequence having the low PAPR characteristic is determined (or used) by assuming only the FDSS filter, a sequence having a lower PAPR characteristic than the sequence in the above case may be used. In other words, since there is a limit that the PAPR performance is good in both the case of applying the filter and the case of not applying the filter, the following method is proposed by considering that there is the limit that the PAPR performance is good.

(Method 4)

Method 4 relates to a method in which elements constituting one sequence are M-PSK/M-QAM symbols and one sequence set is constituted by a total of K sequences having a sequence length of N and $K_1(>0)$ sequences in which a specific PAPR has an excellent characteristic are used when a specific FDSS filter is used and $K_2(>0)$ sequences having the excellent PAPR characteristic are used when the FDSS filter is not used.

The total number of sequences constituting one sequence set is $K=K_1+K_2$.

By considering multiple environments such as whether specific FDSS filters are used a lot or whether the FDSS filter is not primarily used, the $K_1$ and $K_2$ may be considered. For example, if K length-N sequences are defined (or constituted or used) by considering that the specific FDSS filter is primarily used, a sequence set of $K_1>>K_2>0$ may be constituted.

Alternatively, if one sequence set is constituted (or determined) (K sequences are constituted (or determined) by targeting the case where the FDSS filter is not used, a sequence set of $K_1>>K_2>0$ may be constituted (or determined). For example, by assuming K=30, an extreme case such as a case of $K_1=27$, $K_2=3$ may be considered.

For example, if 30 sequences constitute one sequence set by considering the length-6 sequence constituted by 8-PSK symbols, a sequence presented in Table 13 below may be used. It is proposed that some or all of the sequences are used as a reference signal sequence such as the DMRS in the DFT-s-OFDM system.

Table 13 below is configured by assuming $K=K_1+K_2=47$.

As shown in Table 13, sequences #1 to #15 are sequence to use not using the FDSS filter as a main target and sequences #16 to #30 are sequences which will consider that FDSS filters corresponding to the time-domain response are together used and uses together using the FDSS filters as a target. A PAPR performance difference depending on whether to use the filter may be confirmed in Table 13 presented. Further, the following sequence is configured to have the following characteristics.

- It is characterized in that the maximum cyclic auto-correlation is low (equal to or smaller than approximately 0.2357) in +1 and −1 cyclic auto-correlation.
- It is characterized in that the maximum cyclic auto-correlation is low (equal to or smaller than approximately 0.4714) in +2, +1, −1, and −2 cyclic auto-correlation.
- It is characterized in that the maximum cyclic auto-correlation is low (equal to or smaller than approximately 0.80474) in +3, +2, +1, −1, −2, and −3 cyclic auto-correlation.
- Among K chosen sequences, all available cyclic shifted forms of a specific length-N sequence may be regarded as the same sequence. Accordingly, among K chosen sequences, no specific sequence is the same as an available cyclic shifted form of another sequence.
- It is configured so that there is no sequence of a form in which only the phase is just shifted among K chosen sequences. In other words, sequences of a form in which six sequence elements are multiplied by the same phase are regarded as the same sequence and excluded. In Table 13 below, a first sequence element of each sequence is fixed to −7, but when all of 6 elements corresponding to each sequence should are similarly phase-shifted, each sequence should be regarded as the same sequence. In other words, although not presented in Table 13 below, it can be seen that when the following sequence is phase-shifted, each sequence which is the same sequence is included in the sequence proposed in the present disclosure.

TABLE 13

| Sequence index u | Sequences $\phi_u^{(n)}$ | PAPR [dB] under FDSS filter [0.28 1.0 0.28] | PAPR [dB] without FDSS filter |
| --- | --- | --- | --- |
| 1 | −7 −7 −5 1 −5 5 | 2.2775 | 1.7169 |
| 2 | −7 −7 −5 1 −5 7 | 3.2781 | 1.8879 |
| 3 | −7 −5 −5 −1 −7 3 | 2.2728 | 1.7325 |
| 4 | −7 −5 7 1 7 −7 | 3.2781 | 1.8879 |
| 5 | −7 −3 −3 −1 5 −1 | 2.2728 | 1.7325 |
| 6 | −7 −3 −1 5 −1 −3 | 2.7821 | 1.8653 |
| 7 | −7 −3 7 1 7 −7 | 2.2775 | 1.7169 |
| 8 | −7 −1 −7 3 7 7 | 2.2728 | 1.7325 |
| 9 | −7 −1 1 1 3 −1 | 3.2781 | 1.8879 |
| 10 | −7 −1 1 1 5 −1 | 2.2775 | 1.7169 |
| 11 | −7 −1 1 5 1 −1 | 2.7821 | 1.8653 |
| 12 | −7 3 −3 1 1 3 | 2.2775 | 1.7169 |
| 13 | −7 3 −3 3 5 5 | 2.2728 | 1.7325 |
| 14 | −7 3 −1 1 1 3 | 3.2781 | 1.8879 |
| 15 | −7 3 1 −3 1 3 | 2.7821 | 1.8653 |
| 16 | −7 −3 −7 −3 −5 5 | 1.5945 | 3.4043 |
| 17 | −7 −3 −7 −3 1 −5 | 1.5945 | 3.4043 |
| 18 | −7 −3 −7 −3 1 −1 | 1.4462 | 3.1777 |
| 19 | −7 −3 −7 5 −7 −3 | 1.5120 | 3.4679 |
| 20 | −7 −3 −5 −1 3 −1 | 1.4415 | 3.6409 |
| 21 | −7 −3 1 −3 −7 −3 | 1.5311 | 3.5024 |
| 22 | −7 −3 1 −3 1 −5 | 1.4597 | 3.1244 |
| 23 | −7 −3 1 −3 1 −3 | 1.5120 | 3.4679 |
| 24 | −7 −3 1 −3 7 −5 | 1.4371 | 3.5745 |
| 25 | −7 −3 1 −1 3 −3 | 1.4300 | 3.5842 |
| 26 | −7 −3 1 5 1 −3 | 0.7839 | 3.0103 |
| 27 | −7 −3 7 3 7 −5 | 1.4300 | 3.5842 |
| 28 | −7 −3 7 5 −7 −3 | 1.4597 | 3.1244 |
| 29 | −7 −3 7 5 −7 5 | 1.5945 | 3.4043 |
| 30 | −7 3 −1 3 7 5 | 1.4415 | 3.6409 |
| 31 | −7 3 1 5 −7 5 | 1.4462 | 3.1777 |
| 32 | −7 3 7 3 7 −5 | 1.4609 | 3.1778 |
| 33 | −7 3 7 5 −7 −3 | 1.4371 | 3.5745 |
| 34 | −7 5 −7 −3 −7 5 | 1.5120 | 3.4679 |
| 35 | −7 5 −7 −3 −5 −1 | 1.4371 | 3.5745 |
| 36 | −7 5 −7 −3 −5 5 | 1.4597 | 3.1244 |
| 37 | −7 5 −7 −3 1 −3 | 0.7788 | 2.9581 |
| 38 | −7 5 −7 5 1 5 | 1.5311 | 3.5024 |
| 39 | −7 5 −1 3 1 5 | 1.4300 | 3.5842 |
| 40 | −7 5 1 −3 1 5 | 0.7839 | 3.0103 |
| 41 | −7 5 1 5 −7 −3 | 0.7788 | 2.9581 |
| 42 | −7 5 1 5 1 5 | 1.5120 | 3.4679 |
| 43 | −7 7 −5 −1 −5 −1 | 1.4609 | 3.1778 |
| 44 | −7 7 −5 −1 −5 5 | 1.4300 | 3.5842 |
| 45 | −7 7 −5 5 1 5 | 1.4371 | 3.5745 |
| 46 | −7 7 1 5 −7 5 | 1.5945 | 3.4043 |
| 47 | −7 7 1 5 1 5 | 1.4597 | 3.1244 |

Table 13 shows one example of the proposed 8-PSK based sequence set (length-6) and the modulation symbols are generated by $s_u(n)=e^{j\Phi_u(n)\pi/8}$. The PAPR performance is evaluated in the DFT-s-OFDM system having the Comb-2 type DMRS for one RB.

In Table 13 above, sequences #1 to #15 are sequence to use not using the FDSS filter as a main target and sequences #16 to #47 are sequences which choose (or determine or configure) the case of using the FDSS filter corresponding to the time-domain response [0.28 1.0 0.28] as the target.

(Method 5)

In Method 5, it is apparent that when the FDSS filter is used, the PAPR characteristic is improved with probability, but the PAPR is not optimized in terms of each sequence. As described in the present disclosure, it can be seen that a specific FDSS filter is applied to a specific sequence, the PAPR characteristic of the specific sequence deteriorates.

Based thereon, it is proposed that the transmitter uses different FDSS filters according to a sequence, a sequence group, and/or a set of sequences (sub set) transmitted. Further, one sequence set optimized to the used FDSS filter is constituted (or determined) to be used by the UE/eNB. As one example, a system/device illustrated in FIG. 19 may be considered. Different sequences may be used for each specific RB(s) and/or for each a group of RB(s) and the transmitter may use different sequences for each OFDM symbol and/or for each slot(s).

In order for a receiver to help approximately reconstructing different sequences, the transmitter may inform the receiver of which FDSS filter is to used in the specific sequence. In addition/alternatively, the receiver may indicate to the transmitter which filter is to be used for each specific sequence and for each sequence group. Alternatively, the receiver and the transmitter may predefine (or promise) which FDSS filter is used for which sequence and use the corresponding FDSS filter.

One sequence set/group/table is constituted and sequences may be used, which are optimized to FDSS filter #1, FDSS filter #2, ..., FDSS filter #D used. In other words, D optimized sequence groups/sub-sets are configured, to which the PAPR performance (and/or including various criteria/performances such as cross-correlation/auto-correlation) is optimized by using the FDSS filter with respect to D FDSS filters to be used and defined (or configured) as one set/group, and as a result, the transmitter may be used for transmitting the reference signals including the DMRS, the SRS, the CSI-RS, and the like.

Additionally, by considering even the case of not using the FDSS filter, a total of (D+1) sequence groups (or sub-sets) in which the PAPR performance is optimized are constituted with respect to the case of using D FDSS filters and the case of not using the FDSS filter and one sequence set/group/table is constituted, and as a result, the transmitter may be used for transmitting the reference signal/data signal.

Figure 19:
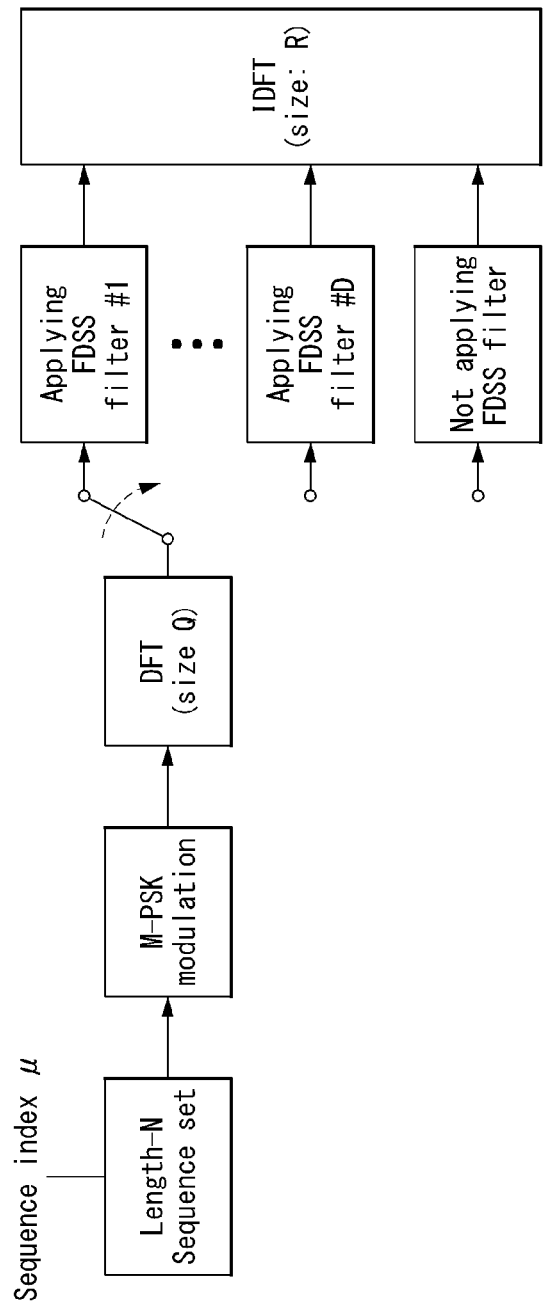
FIG. 19 illustrates one example for adaptively applying an FDSS filter proposed in the present disclosure.

FIG. 19 illustrates one example for adaptively applying an FDSS filter proposed in the present disclosure.

NR Rel-16 supports binary CGS in Tables 1, 2, and 3 with respect to lengths 12, 18, and 14, respectively and then pi/2 BPSK modulation is followed, and then DFT is followed as a DMRS sequence for 7/2 BPSK modulation with respect to both the PUSCH and the PUCCH.

The above contents are applicable to a single DMRS configuration. CGS for a 2-symbol DMRS configuration may be discussed. Tables 1, 2, and 3 may be discovered in R1-1901362.

Here, the CGS may be used up to length-8 and 8-PSK may be used for length-6.

Hereinafter, in the 2-symbol DMRS configuration, a computer generation sequence applying method will be described.

In two symbols, the same computer generate sequence (CGS) may be used.

In a CGS set (among 30 sequences), when a specific sequence is used in a first symbol, the specific sequence is configured to be used in a next symbol in link therewith.

In this case, among other sequences other than the specific sequence used in the first symbol, a sequence having a lowest cross-correlation with the specific sequence used in the first symbol may be used in a second symbol in a sequence set/group/table.

Alternatively, according to another criterion, two sequences may be made into one pair and predetermined (or defined) to be used in two concatenated OFDM symbols or the eNB may configure (or indicate) the sequence pair to the UE.

It is conceivable that independent computer generation sequences (CGSs) are used with respect to a first (1st) DMRS symbol and a second ($2^{nd}$) DMRS symbol, respectively.

To this end, 30 CGSs are defined per symbol to define a total of 60 CGSs. In this case, 30 sequences may be considered as one sequence set.

In this case, it may be considered that the sequence set is defined so that the cross-correlation between two sequence sets is minimized. Alternatively, when the specific sequence is used in the first ($1^{st}$) DRMS symbol, a specific sequence and/or specific sequence sub-set (some of 30 sequences) to be used in the second ($2^{nd}$) DMRS symbol may be used.

8-PSK is used with respect to length-6 CGS.

In the case of PUSCH having one OFDM symbol DMRS and pi/2 BPSK modulation, one of the following alternatives is selected.

Alternative 0: Only a single DMRS is supported (one comb is used).

Alternative 1: One DMRS port is supported per comb (in a total of 2 ports).

Alternative 2: Two DMRS ports are supported per comb (in a total of 4 ports).

Hereinafter, an additional embodiment for Method 2 described above will be described through Method 2-1.

(Method 2-1)

Method 2-1 relates to relaxing the cyclic auto-correlation performance in Method 2 above. A sequence having a better PAPR characteristic may be used through relaxation and there may be a method in which the number of sequences constituting one sequence set is significantly increased to selectively/adaptively use the sequences. In Method 2, when the condition of Method 2 is relaxed under a condition in which the PAPR is 2.3 dB or less at the time of using the FDSS filter and the PAPR is 3.2 dB or less at the time of not using the FDSS filter, sequences presented in Table 14 below may be obtained. It is proposed that one or more some sequences or all sequences of the sequences presented in Table 14 above are used as the DFT-spread-OFDM based DMRS sequence.

TABLE 14

| Sequence index u | Sequences $\phi_u^{(n)}$ | PAPR [dB] under FDSS filter [0.28 1.0 0.28] | PAPR [dB] without FDSS filter |
|---|---|---|---|
| 1 | −7 −7 −5 1 −5 5 | 2.2775 | 1.7169 |
| 2 | −7 −7 −3 3 −1 −7 | 2.2833 | 2.9253 |
| 3 | −7 −7 3 −1 5 −7 | 2.2833 | 2.9253 |
| 4 | −7 −5 −7 −3 3 −1 | 1.9710 | 2.9166 |
| 5 | −7 −5 −7 −3 5 1 | 2.1099 | 2.8312 |
| 6 | −7 −5 −7 −1 5 1 | 2.0214 | 3.0285 |
| 7 | −7 −5 −5 −1 −7 3 | 2.2728 | 1.7325 |
| 8 | −7 −5 −1 −7 3 1 | 2.1081 | 2.4678 |
| 9 | −7 −5 −1 5 1 −5 | 1.9058 | 2.4184 |
| 10 | −7 −5 −1 5 1 −3 | 2.1617 | 2.5641 |
| 11 | −7 −5 −1 7 5 −1 | 2.2544 | 2.9451 |
| 12 | −7 −5 3 −1 5 −5 | 1.9966 | 3.1184 |
| 13 | −7 −5 3 −1 7 −5 | 2.0883 | 2.8683 |
| 14 | −7 −5 3 1 −5 5 | 2.1140 | 2.4372 |
| 15 | −7 −5 3 7 5 −1 | 1.9282 | 3.0378 |
| 16 | −7 −5 5 −1 −3 1 | 1.9385 | 3.1365 |
| 17 | −7 −5 5 −1 −3 5 | 2.2274 | 2.8838 |
| 18 | −7 −5 5 1 7 −5 | 1.9941 | 2.8754 |
| 19 | −7 −5 7 3 −1 5 | 2.1652 | 2.6502 |

TABLE 14-continued

| Sequence index u | Sequences $\phi_u^{(n)}$ | PAPR [dB] under FDSS filter [0.28 1.0 0.28] | PAPR [dB] without FDSS filter |
| --- | --- | --- | --- |
| 20 | −7 −3 −7 −3 1 −1 | 1.4462 | 3.1777 |
| 21 | −7 −3 −7 3 1 5 | 1.9850 | 2.2841 |
| 22 | −7 −3 −5 −3 5 1 | 2.1099 | 2.8312 |
| 23 | −7 −3 −5 −3 7 3 | 1.9710 | 2.9166 |
| 24 | −7 −3 −5 5 −1 1 | 1.9500 | 3.1462 |
| 25 | −7 −3 −5 5 1 3 | 2.2957 | 3.1261 |
| 26 | −7 −3 −5 5 1 5 | 1.9675 | 2.3452 |
| 27 | −7 −3 −5 7 −5 −1 | 1.7721 | 2.9294 |
| 28 | −7 −3 −3 −3 7 3 | 2.2914 | 3.0354 |
| 29 | −7 −3 −3 −1 5 −1 | 2.2728 | 1.7325 |
| 30 | −7 −3 −1 −5 7 3 | 2.1387 | 2.6592 |
| 31 | −7 −3 −1 −3 7 3 | 1.9133 | 2.5031 |
| 32 | −7 −3 −1 7 5 −1 | 2.1289 | 2.4781 |
| 33 | −7 −3 1 −5 −1 −3 | 1.7721 | 2.9294 |
| 34 | −7 −3 1 −3 −5 −1 | 1.7809 | 2.8344 |
| 35 | −7 −3 1 −3 1 −5 | 1.4597 | 3.1244 |
| 36 | −7 −3 1 −3 7 5 | 1.9675 | 2.3452 |
| 37 | −7 −3 1 −1 −7 5 | 1.9850 | 2.2841 |
| 38 | −7 −3 1 5 1 −5 | 1.9558 | 2.3581 |
| 39 | −7 −3 1 5 1 −3 | 0.7839 | 3.0103 |
| 40 | −7 −3 1 5 3 −3 | 1.9558 | 2.3581 |
| 41 | −7 −3 3 −1 −5 7 | 2.1652 | 2.6502 |
| 42 | −7 −3 5 3 −3 7 | 2.2274 | 2.8838 |
| 43 | −7 −3 5 7 1 −5 | 1.9282 | 3.0378 |
| 44 | −7 −3 7 −5 −1 −5 | 1.7592 | 2.9005 |
| 45 | −7 −3 7 1 −1 7 | 2.1140 | 2.4372 |
| 46 | −7 −3 7 1 7 −7 | 2.2775 | 1.7169 |
| 47 | −7 −3 7 5 −7 −3 | 1.4597 | 3.1244 |
| 48 | −7 −1 −7 3 7 7 | 2.2728 | 1.7325 |
| 49 | −7 −1 −5 3 5 3 | 2.0214 | 3.0285 |
| 50 | −7 −1 −5 5 3 5 | 1.9133 | 2.5031 |
| 51 | −7 −1 −5 5 5 5 | 2.2914 | 3.0354 |
| 52 | −7 −1 −5 5 7 5 | 1.9710 | 2.9166 |
| 53 | −7 −1 −5 7 3 5 | 2.1387 | 2.6592 |
| 54 | −7 −1 −3 −1 7 3 | 2.0214 | 3.0285 |
| 55 | −7 −1 1 −3 7 5 | 2.2957 | 3.1261 |
| 56 | −7 −1 1 1 5 −1 | 2.2775 | 1.7169 |
| 57 | −7 −1 3 1 3 −3 | 1.9941 | 2.8754 |
| 58 | −7 −1 3 3 3 −3 | 2.2833 | 2.9253 |
| 59 | −7 −1 3 5 1 −3 | 2.1617 | 2.5641 |
| 60 | −7 −1 3 5 3 −3 | 1.9058 | 2.4184 |
| 61 | −7 −1 5 3 5 −3 | 1.9966 | 3.1184 |
| 62 | −7 1 −3 3 −7 −7 | 2.0214 | 3.0285 |
| 63 | −7 1 −3 5 −7 −7 | 2.1099 | 2.8312 |
| 64 | −7 1 −3 5 7 5 | 2.1099 | 2.8312 |
| 65 | −7 1 −1 −7 3 7 | 2.1081 | 2.4678 |
| 66 | −7 1 3 −3 7 5 | 1.9500 | 3.1462 |
| 67 | −7 1 3 1 5 −3 | 2.0805 | 2.9022 |
| 68 | −7 1 3 1 7 −3 | 1.9909 | 3.1248 |
| 69 | −7 1 3 7 1 −5 | 2.1289 | 2.4781 |
| 70 | −7 1 5 3 −3 7 | 1.9385 | 3.1365 |
| 71 | −7 1 5 3 5 −3 | 2.0883 | 2.8683 |
| 72 | −7 1 5 7 1 −5 | 2.2544 | 2.9451 |
| 73 | −7 3 −3 −5 −1 7 | 1.9282 | 3.0378 |
| 74 | −7 3 −3 −5 3 5 | 2.1289 | 2.4781 |
| 75 | −7 3 −3 −5 3 7 | 2.2544 | 2.9451 |
| 76 | −7 3 −3 −1 3 −5 | 2.2274 | 2.8838 |
| 77 | −7 3 −3 −1 7 −5 | 1.9385 | 3.1365 |
| 78 | −7 3 −3 1 1 3 | 2.2775 | 1.7169 |
| 79 | −7 3 −3 1 3 −5 | 2.1140 | 2.4372 |
| 80 | −7 3 −3 3 5 5 | 2.2728 | 1.7325 |
| 81 | −7 3 −1 3 7 −5 | 1.9850 | 2.2841 |
| 82 | −7 3 −1 5 −7 −5 | 1.9133 | 2.5031 |
| 83 | −7 3 −1 5 −7 7 | 1.9710 | 2.9166 |
| 84 | −7 3 1 −7 −3 −1 | 2.2631 | 2.9654 |
| 85 | −7 3 1 3 7 −3 | 1.9091 | 2.5047 |
| 86 | −7 3 1 5 −7 5 | 1.4462 | 3.1777 |
| 87 | −7 3 1 5 −5 −3 | 2.2957 | 3.1261 |
| 88 | −7 3 1 5 −3 −1 | 1.9500 | 3.1462 |
| 89 | −7 3 5 −7 1 −1 | 2.2631 | 2.9654 |
| 90 | −7 3 5 −3 1 −1 | 1.9500 | 3.1462 |
| 91 | −7 3 5 3 7 −3 | 1.9801 | 2.9603 |
| 92 | −7 3 7 −5 7 5 | 1.7721 | 2.9294 |
| 93 | −7 3 7 3 7 −5 | 1.4609 | 3.1778 |
| 94 | −7 3 7 5 1 5 | 1.7809 | 2.8344 |
| 95 | −7 5 −7 −3 −5 5 | 1.4597 | 3.1244 |
| 96 | −7 5 −7 −3 1 −3 | 0.7788 | 2.9581 |
| 97 | −7 5 −7 −3 7 −5 | 1.7809 | 2.8344 |
| 98 | −7 5 −5 −1 −3 −1 | 1.9801 | 2.9603 |
| 99 | −7 5 −5 −1 1 −3 | 2.1652 | 2.6502 |
| 100 | −7 5 −5 −1 1 −1 | 1.9091 | 2.5047 |
| 101 | −7 5 −5 1 −1 1 | 1.9909 | 3.1248 |
| 102 | −7 5 −3 −1 −3 1 | 2.0883 | 2.8683 |
| 103 | −7 5 −3 −1 −3 3 | 1.9966 | 3.1184 |
| 104 | −7 5 −3 1 −1 1 | 2.0805 | 2.9022 |
| 105 | −7 5 −1 −3 −1 3 | 1.9058 | 2.4184 |
| 106 | −7 5 −1 −3 1 5 | 1.9558 | 2.3581 |
| 107 | −7 5 −1 −1 −1 3 | 2.2833 | 2.9253 |
| 108 | −7 5 −1 1 −1 3 | 1.9941 | 2.8754 |
| 109 | −7 5 1 −3 −1 3 | 2.1617 | 2.5641 |
| 110 | −7 5 1 −3 1 5 | 0.7839 | 3.0103 |
| 111 | −7 5 1 −3 3 7 | 2.1617 | 2.5641 |
| 112 | −7 5 1 3 7 −3 | 2.1652 | 2.6502 |
| 113 | −7 5 1 5 −7 −3 | 0.7788 | 2.9581 |
| 114 | −7 5 1 7 −5 −3 | 2.1387 | 2.6592 |
| 115 | −7 5 3 7 1 5 | 1.7721 | 2.9294 |
| 116 | −7 5 7 −5 1 −3 | 2.1387 | 2.6592 |
| 117 | −7 5 7 −3 1 −1 | 2.2957 | 3.1261 |
| 118 | −7 7 −7 −3 3 −1 | 1.9133 | 2.5031 |
| 119 | −7 7 −5 −1 −5 −1 | 1.4609 | 3.1778 |
| 120 | −7 7 −5 −1 3 −1 | 1.9850 | 2.2841 |
| 121 | −7 7 −5 1 −3 7 | 1.9941 | 2.8754 |
| 122 | −7 7 −5 3 −1 7 | 2.0883 | 2.8683 |
| 123 | −7 7 −5 3 5 −1 | 1.9385 | 3.1365 |
| 124 | −7 7 −5 5 −7 −3 | 1.7809 | 2.8344 |
| 125 | −7 7 −3 3 −1 7 | 1.9966 | 3.1184 |
| 126 | −7 7 −1 1 5 −1 | 2.1140 | 2.4372 |
| 127 | −7 7 −1 3 5 −1 | 2.2274 | 2.8838 |
| 128 | −7 7 1 −5 −3 1 | 2.2544 | 2.9451 |
| 129 | −7 7 1 −5 −3 5 | 1.9282 | 3.0378 |
| 130 | −7 7 1 −5 −1 1 | 2.1289 | 2.4781 |
| 131 | −7 7 1 −3 1 5 | 1.9558 | 2.3581 |
| 132 | −7 7 1 −3 3 7 | 1.9058 | 2.4184 |
| 133 | −7 7 1 5 1 5 | 1.4597 | 3.1244 |
| 134 | −7 7 3 7 −5 5 | 1.7592 | 2.9005 |

Table 14 shows one example of the proposed 8-PSK based sequence set (length-6) and the modulation symbols are generated by $s_u(n)=e^{j\phi_u(n)\pi/8}$. The PAPR performance is evaluated in the DFT-s-OFDM system having the Comb-2 type DMRS for one RB.

(Method 6)

In Method 6, it is characterized in that when frequency-RE is used as Comb-2 type in the frequency domain, a time-axis signal is shown repeatedly twice. Accordingly, in order to transmit the length-6 DMRS sequence in a step before DFT in the DFT-spread-OFDM system, the length-6 sequence needs to be used by considering that the length-6 sequence is repeated twice in the time domain. Accordingly, in a (pre-)DFT procedure, the length-6 sequence should be used to be repeated twice.

$$x_{2N} = D_{DFT} \begin{bmatrix} s_N \\ s_N \end{bmatrix} \qquad \text{[Equation 10]}$$

Here, $D_{DFT}$ represents a Discrete Fourier Transform (DFT) matrix.

$s_N = [s_1, s_2, \ldots, s_6]$ represents a 6×1 vector (one length-6 sequence) and each element $S_i$ represents the M-PSK/M-QAM symbol.

$x_{2N}$ represents a 12×1 vector which is a frequency-domain signal after DFT processing of $$\begin{bmatrix} s_N \\ s_N \end{bmatrix}.$$

In this case, when the DMRS sequence is transmitted by the DFT-spread-OFDM scheme, a DFT computation is performed by using a form in which the length-6 sequence is repeated twice in the pre-DFT step as mentioned above at the time of transmitting a single-port DMRS.

When the number of DMRS ports is 2, a specific DMRS port may be configured in a comb-2 type in which a frequency offset is 0 and the other DMRS port may be configured in a comb-2 type in which the frequency offset is 1. In this case, when the length-6 sequence to be used in the second DMRS port and the length-6 sequence to be used in the first DMRS port are mapped to a frequency axis through a (pre-)DFT process as shown in Equation 8 above, both the length-6 sequences are allocated to a Comb-2 structure (comb-2 structure in which the frequency offset is 0) having the same frequency offset. Accordingly, when both DMRS ports are used, a shifting operation on the frequency axis may be additionally required. However, in this case, since the additional shifting operation is required, the two-port DMRS sequence may be transmitted/configured to single symbols through different (even and odd) Comb-2 by the following scheme.

Sequence transmitted to first DRMS port: $s_N^{(1)} \in C^{6 \times 1}$ (6×1 vector)

Sequence transmitted to second DRMS port: $s_N^{(2)} \in C^{6 \times 1}$ (6×1 vector)

The sequence may be a different sequence or the same sequence selected in the length-6 DMRS sequence table.

In order to transmit the sequences transmitted in both DMRS ports through different Comb-2, the sequence transmitted to the first DRMS port is multiplied by the DFT matrix in the form of $$\begin{bmatrix} s_N^{(1)} \\ s_N^{(1)} \end{bmatrix}$$

for the (pre-)DFT processing (the DFT processing is performed) and in the case of the second DMRS port, the (pre-)DFT processing may be performed in the form of $$\begin{bmatrix} s_N^{(2)} \\ -s_N^{(2)} \end{bmatrix} \text{ and/or } \begin{bmatrix} -s_N^{(2)} \\ +s_N^{(2)} \end{bmatrix}.$$

Consequently, for the sequence transmitted to the second DMRS port, even though additional shifting processing is not performed after DFT processing, a non-zero value is configured/transmitted to six odd-numbered REs as the frequency offset is set to 1 and 0 or the non-zero value is mapped/transmitted to six even-numbered REs.

For first DMRS port:

$$x_{2N} = D_{DFT} \begin{bmatrix} s_N \\ s_N \end{bmatrix} \qquad \text{[Equation 11]}$$

For second DMRS port:

$$x_{2N} = D_{DFT} \begin{bmatrix} s_N \\ -s_N \end{bmatrix} \text{ or } x_{2N} = D_{DFT} \begin{bmatrix} -s_N \\ s_N \end{bmatrix} \qquad \text{[Equation 12]}$$

In the scheme, the sequences transmitted to both ports, respectively are orthogonal to each other on the frequency axis even though time-domain OCC is not configured at the (pre-)DFT end, the sequences are distinguished. In other words, different sequences may be mapped (or configured or transmitted) to both DMRS ports.

For reference, the first and second DMRS ports mentioned in the present disclosure mean different DMRS ports and are independent of a DMRS port index.

In Methods 2, 2-1, and 2-2 mentioned above, a frequency RE mapping matrix is multiplied after DFT in order to map two antenna ports (e.g., two DMRS antenna ports) onto the frequency axis through two Comb-2 structures.

In Methods 2, 2-1, and 2-2, two different antenna ports may be considered and a case may be considered in which Method 6 above is used for Comb-2 type frequency RE mapping for each antenna port.

In other words, referring to Equations 11 and 12 of Method 6, length-6 sequences transmitted to first and second antenna ports after pre-DFT are allocated to a frequency RE in which the frequency offset is "0" and a frequency RE in which the frequency offset is "1", respectively. By considering Method 6 above, Method 2-3 below is proposed similarly to Method 2-2.

Hereinafter, an additional embodiment for Method 2 described above will be described through Method 2-3.

(Method 2-3)

Method 2-3 relates to a method in which all sequences presented in Table 15 are used, in which each sequence element is constituted by 15-(Phase Shift Keying (PSK) symbols and the length is 6 or some of the sequences presented in Table 15 are used as uplink PUSCH and/or PUCCH DMRS sequences.

The proposed sequences may be used for Discrete Fourier Transform Spread Orthogonal Frequency Division Multiplexing (DFT-s-OFDM) and/or Cyclic Prefix OFDM (CP-OFDM). In the case of Method 2-3, since N=6 and M=8, the total number of sequences which may be considered is $8^6$. Here, a total of two antenna ports (e.g., two DMRS antenna ports) are considered and each antenna port is subject to Frequency Division Multiplexing (FDM) in the form of Comb-2.

In this case, in order to map the length-6 sequences of two antenna ports through the Comb-2 structure, the length-6 sequence of the first port is repeated twice and the length-6 sequence of the second port is repeatedly output by changing a sign.

A rule of generating (or choosing or using) K (>0) some sequences among a total of sequences is as follows. Here, K=45 is assumed.

A main feature of the proposed sequence is that two antenna ports subject to FDM in the form of Comb-2 show a low PAPR characteristic of 2.2 dB or less when the FDSS filter (FDSS filter in which the time-domain response is [0.28 1 0.28]) is applied and a low PAPR characteristic of 2.9 dB even when the FDSS filter is not applied.

Additionally, the proposed sequence has the following characteristics.

The proposed sequence has a characteristic that the maximum cyclic auto-correlation is equal to or smaller than approximately 0.2357 in +1 and −1 cyclic auto-correlation.

The proposed sequence has a characteristic that the maximum cyclic auto-correlation is equal to or smaller than approximately 0.85 in +3, +2, +1, −1, −2, and −3 cyclic auto-correlation lags.

Among K chosen sequences, all available cyclic shifted forms of a specific length-N sequence may be regarded as the same sequence. Accordingly, among K chosen sequences, no specific sequence is the same as an available cyclic shifted form of another sequence.

TABLE 15

| index u | Sequences $\phi_u^{(n)}$ | PAPR [dB] under FDSS filter for the 1st port | PAPR [dB] under FDSS filter for the 2nd port | PAPR [dB] without FDSS filter for the 1st port | PAPR [dB] without FDSS filter for the 2nd port |
|---|---|---|---|---|---|
| 1 | −7 −7 3 7 −5 5 | 1.5699 | 2.0795 | 2.6332 | 2.2218 |
| 2 | −7 −5 −1 −7 5 −1 | 2.1235 | 1.9930 | 2.8984 | 2.1349 |
| 3 | −7 −5 −1 5 1 −5 | 1.9058 | 1.8246 | 2.4184 | 1.6003 |
| 4 | −7 −5 −1 5 1 −3 | 2.1617 | 2.0738 | 2.5641 | 2.4144 |
| 5 | −7 −5 5 1 −7 −3 | 1.8689 | 1.9449 | 2.1792 | 1.6280 |
| 6 | −7 −5 5 1 −5 −3 | 1.7645 | 1.9261 | 2.4494 | 1.3633 |
| 7 | −7 −5 5 1 −5 −1 | 1.0700 | 1.9930 | 2.4043 | 2.1349 |
| 8 | −7 −5 5 1 7 −5 | 1.9941 | 1.4471 | 2.8754 | 2.2516 |
| 9 | −7 −3 −1 −7 5 −1 | 2.0060 | 1.9261 | 2.5274 | 1.3633 |
| 10 | −7 −3 −1 3 −1 −5 | 2.0580 | 2.0726 | 2.8206 | 2.4402 |
| 11 | −7 −3 −1 5 1 −5 | 2.1968 | 1.8320 | 1.7589 | 1.7234 |
| 12 | −7 −3 −1 7 3 −5 | 1.7644 | 2.1163 | 2.1336 | 2.1126 |
| 13 | −7 −3 1 −5 7 3 | 1.3980 | 1.9740 | 1.4299 | 1.8975 |
| 14 | −7 −3 1 7 3 −1 | 1.4188 | 1.9609 | 1.3790 | 1.9672 |
| 15 | −7 −3 5 1 −5 −3 | 1.8753 | 1.9562 | 2.1527 | 1.6412 |
| 16 | −7 −3 7 3 −3 −1 | 1.0858 | 1.9763 | 2.4351 | 2.1548 |
| 17 | −7 −3 7 3 −1 3 | 1.5866 | 2.0603 | 2.7305 | 2.8314 |
| 18 | −7 −1 3 −7 5 3 | 2.0574 | 1.9619 | 2.8329 | 2.1978 |
| 19 | −7 3 −1 −7 −5 −1 | 2.0154 | 1.9050 | 2.4374 | 1.3575 |
| 20 | −7 3 −1 −7 −3 −1 | 2.1603 | 1.9619 | 2.8474 | 2.1978 |
| 21 | −7 3 −1 5 −7 −5 | 1.9133 | 1.8229 | 2.5031 | 1.6731 |
| 22 | −7 3 −1 5 7 −5 | 2.1908 | 1.8229 | 1.7415 | 1.7723 |
| 23 | −7 3 −1 7 −7 −3 | 1.7619 | 2.1268 | 2.1823 | 2.0435 |
| 24 | −7 3 −1 7 −5 −3 | 1.8269 | 1.9568 | 2.8823 | 1.1442 |
| 25 | −7 3 5 7 −5 5 | 1.6755 | 1.9763 | 2.4312 | 2.1548 |
| 26 | −7 3 7 −7 −5 5 | 1.6696 | 1.9930 | 2.3269 | 2.1349 |
| 27 | −7 3 7 −5 5 5 | 1.5402 | 2.0839 | 2.5659 | 2.1980 |
| 28 | −7 3 7 7 −5 5 | 1.4371 | 1.6616 | 2.4208 | 1.9350 |
| 29 | −7 5 −7 −3 3 −1 | 1.2715 | 2.0482 | 2.2025 | 2.8895 |
| 30 | −7 5 −7 −3 7 3 | 2.1954 | 2.0738 | 2.8917 | 2.4144 |
| 31 | −7 5 −5 −1 3 −1 | 1.3007 | 2.0603 | 2.2771 | 2.8314 |
| 32 | −7 5 −3 3 1 5 | 2.0901 | 2.1403 | 2.8433 | 2.7642 |
| 33 | −7 5 1 −5 −1 3 | 1.4188 | 1.9609 | 1.3790 | 1.9672 |
| 34 | −7 5 1 5 7 −5 | 2.0363 | 2.0738 | 2.7382 | 2.4144 |
| 35 | −7 5 1 7 −5 −3 | 2.1387 | 2.0726 | 2.6592 | 2.4402 |
| 36 | −7 5 1 7 −5 −1 | 1.3980 | 1.9740 | 1.4299 | 1.8975 |
| 37 | −7 7 −5 1 −3 7 | 1.9941 | 1.7210 | 2.8754 | 2.3917 |

Table 15 shows one example of the proposed 8-PSK based sequence set (length-6) and the modulation symbols are generated by $s_u(n)=e^{j\phi_u(n)\pi/8}$. The PAPR performance is generated in the DFT-s-OFDM system having Comb-2 type DMRS for one resource block (RB) (TS 38.211, TS 38.214, and TS 38.331 are referred to for Comb-2 type DMRS).

The modulation symbols are generated by $$s_u(n) = e^{\frac{j\phi_u(n)\pi}{8}}.$$

u: Sequence index
n: Element index of each sequence)
The applied FDSS filter corresponds to the time-domain response of [0.28 1.0 0.28].
An IFFT size is 64 and a DFT size is 12.

Some or all of the sequences presented in Table 15 above may be used.

Further, some or all of the sequences presented in Table 15 above and sequences (having different characteristics) not presented in Table 15 above table and one sequence set may be constituted and used. It may be considered that such a constitution as an extension (or application) of the method proposed in the present disclosure is included in the spirit of the method proposed in the present disclosure.

Figure 20:
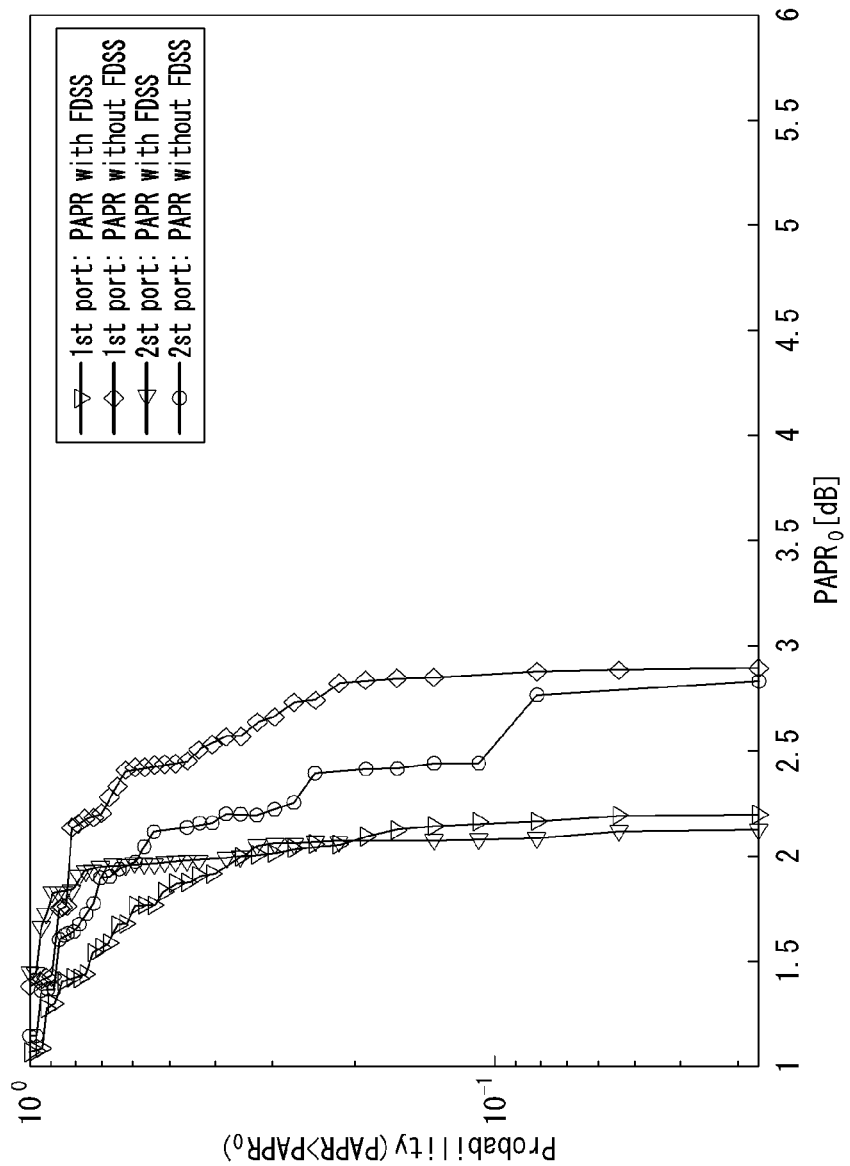
FIG. 20 illustrates PAPR performance for a proposed set of length-6 sequences in which elements of each sequence are constituted by 8-PSK symbols.

FIG. 20 illustrates PAPR performance for a proposed set of length-6 sequences in which elements of each sequence are constituted by 8-PSK symbols.

Low-PAPR Sequence Generation Type 2

Additionally, low-PAPR sequence generation type 2 will be described in brief.

A low-PAPR sequence $r_{u,v}^{(\alpha,\delta)}(n)$ may be defined by a base sequence $\bar{r}_{u,v}(n)$ according to Equation 13 below.

$$r_{u,v}^{(\alpha,\delta)}(n)=\bar{r}_{u,v}(n), \ 0 \leq n < M \quad \text{[Equation 13]}$$

Here, $M=mN_{sc}^{RB}/2^\delta$ represents the length of the sequence. Multiple sequences are defined from a single base sequence through different values of $\alpha$ and $\delta$.

Base sequences $\bar{r}_{u,v}(n)$ are divided into groups and here, $u \in \{0, 1, \ldots, 29\}$ represents a group number and v represents a base sequence number in the group. Each group includes one base sequence v=0 having a length of $M=mN_{sc}^{RB}/2^\delta$, $1/2 \leq m/2^\delta$. A sequence $\bar{r}_{u,v}(0), \ldots, \bar{r}_{u,v}(M-1)$ is defined by Equation 14 below.

$$\bar{r}_{u,v}(n) = \frac{1}{\sqrt{M}} \sum_{i=0}^{N-1} \tilde{r}_{u,v}(i) e^{-j\frac{2\pi i n}{M}} \quad \text{[Equation 14]}$$

$$n = 0, \ldots, M-1$$

n=0, . . . , M−1

Here, a definition of $\tilde{r}_{u,v}(i)$ depends on the sequence length.

Low-PAPR sequence generation type 2 above may be divided into (1) sequences having length 30 or larger and (2) sequences having a length less than 30.

The sequences having the length less than 30 will be described in brief.

Sequences of length less than 30

The sequence $\tilde{r}_{u,v}(i)$ is given by Equation 15 below for M=6.

$$\tilde{r}_{u,v}(i)=e^{j\varphi(i)\pi/8}, \ 0 \leq i \leq M-1 \quad \text{[Equation 15]}$$

Here, a value of $\varphi(i)$ may be given as shown in the above described tables.

The sequence $\tilde{r}_{u,v}(i)$ is obtained by complex value modulation symbols due to π/2-BPSK modulation for M∈{12, 18,24}.

Contents regarding low-PAPR sequence generation type 2 above may be applied to the methods proposed in the present disclosure, which are described above.

The methods, embodiments, and descriptions for implementing the proposal in the present disclosure, which are described above may be separately applied or one or more methods, embodiments, and descriptions may be combined and applied.

Figure 21:
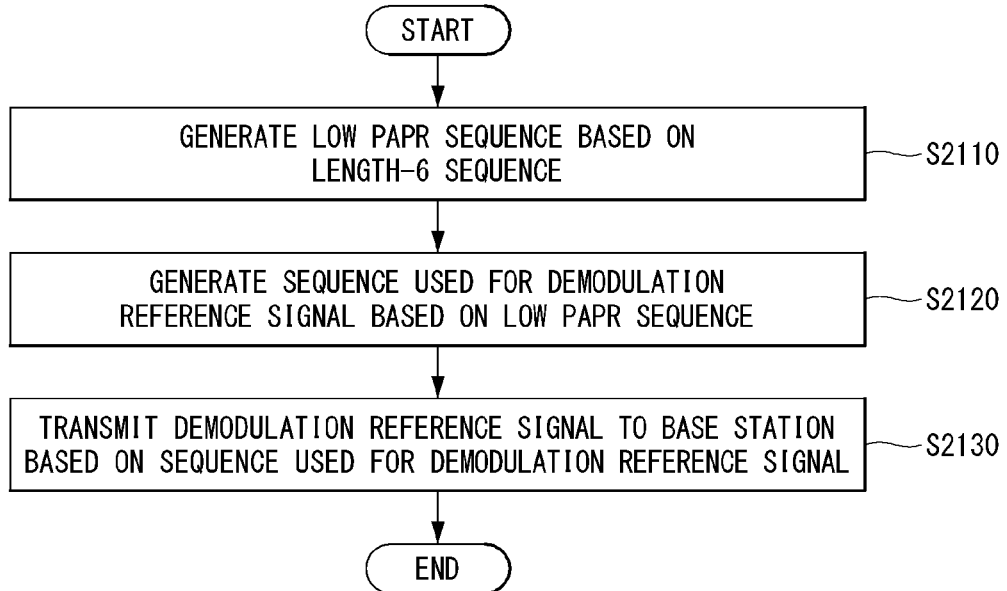
FIG. 21 is a flowchart illustrating one example of a method for generating a low PAPR sequence proposed in the present disclosure.

FIG. 21 is a flowchart showing one example of a method for transmitting a demodulation reference signal for an uplink control signal in the present disclosure.

Specifically, a UE generates a low peak to average power ratio (PAPR) sequence based on a length-6 sequence (S2110).

In addition, the UE generates a sequence used for the demodulation reference signal based on the low PAPR sequence (S2120).

In addition, the UE transmits, to an eNB, the demodulation reference signal based on the sequence used for the demodulation reference signal (S2130).

Here, the length-6 sequence may have an 8-phase shift keying (PSK) symbol as each element of a sequence.

Further, the length-6 sequence may be determined by $e^{j\varphi(i)\pi/8}$ and the i may represent an index of elements of the length-6 sequence.

In addition, the value of φ(i) may include (−1 −7 −3 −5 −1 3), (−7 3 −7 5 −7 −3), (5 −7 7 1 5 1), (−7 3 1 5 −1 3), (−7 −5 −1 −7 −5 5), (−7 1 −3 3 7 5), and (−7 1 −3 1 5 1).

In addition, a cyclic shifted sequence for φ(i) may be the same sequence as φ(i).

A number which the value of φ(i) may have may be $8^6$.

Here, a value of auto-correlation for the low PAPR sequence value may be less than a specific value.

Additionally, the UE may receive, from the eNB, RRC signaling including control information indicating that transform precoding for uplink is enabled.

Further the UE may apply a Frequency Domain Spectrum Shaping (FDSS) filter to the low PAPR sequence.

Here, the low PAPR sequence may be subject to Frequency Division Multiplexing (FDM) with two antenna ports in a Comb-2 form.

Different PAPR sequences may be used for the two antenna ports, respectively.

A specific operation in which the method described in FIG. 21 is implemented in the wireless device will be described.

A UE for transmitting a demodulation reference signal for an uplink control signal in a wireless communication system may include a transceiver for transceiving a radio signal and a processor functionally connected to the transceiver.

The processor of the UE may control to generate a low peak to average power ratio (PAPR) sequence based on a length-6 sequence, generate a sequence used for the demodulation reference signal based on the low PAPR sequence, and transmit, to the eNB, the demodulation reference signal based on the sequence used for the demodulation reference signal.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

Figure 22:
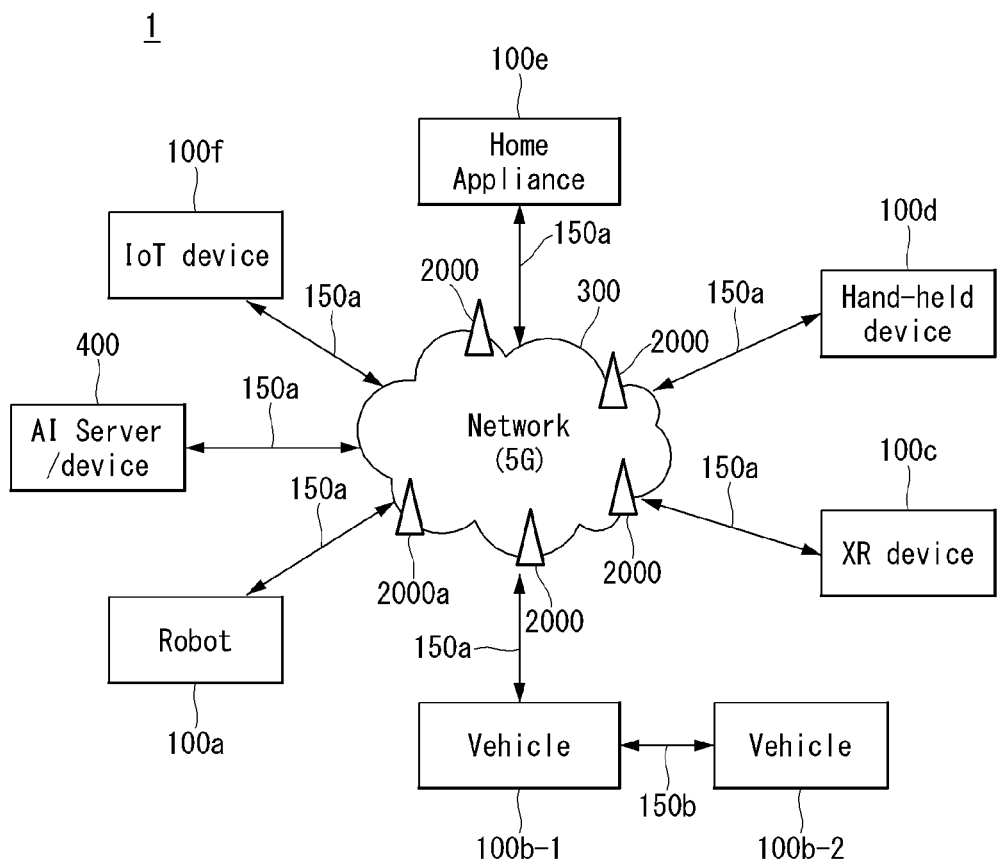
FIG. 22 illustrates a communication system applied to the present disclosure.

FIG. 22 illustrates a communication system applied to the present disclosure.

Referring to FIG. 22, a communication system 1 applied to the present disclosure includes a wireless device, an eNB, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 100a, vehicles 100b-1 and 100b-2, an eXtended Reality (XR) device 100c, a hand-held device 100d, a home appliance 100e, an Internet of Thing (IoT) device 100f, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the eNB and the network may be implemented even the wireless device and a specific wireless device 200a may operate an eNB/network node for another wireless device.

The wireless devices 100a to 100f may be connected to a network 300 through an eNB 200. An artificial intelligence (AI) technology may be applied to the wireless devices 100a to 100f and the wireless devices 100a to 100f may be connected to an AI server 400 through the network 300. The network 300 may be configured by using a 3G network, a 4G (e.g., LTE) network, or a 5G (e.g., NR) network. The wireless devices 100a to 100f may communicate with each other through the eNB 200/network 300, but may directly communicate with each other without going through the eNB/network (sidelink communication). For example, the vehicles 100b-1 and 100b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100a to 100f.

Wireless communications/connections 150a, 150b, and 150c may be made between the wireless devices 100a to 100f and the eNB 200 and between the eNB 200 and the eNB 200. Here, the wireless communication/connection may be made through various wireless access technologies (e.g., 5G NR) such as uplink/downlink communication 150a, sidelink communication 150b (or D2D communication), and inter-eNB communication 150c (e.g., relay, Integrated Access Backhaul (IAB). The wireless device and the eNB/the wireless device and the eNB and the eNB may transmit/receive radio signals to/from each other through wireless communications/connections 150a, 150b, and 150c. For example, the wireless communications/connections 150a, 150b, and 150c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

Figure 23:
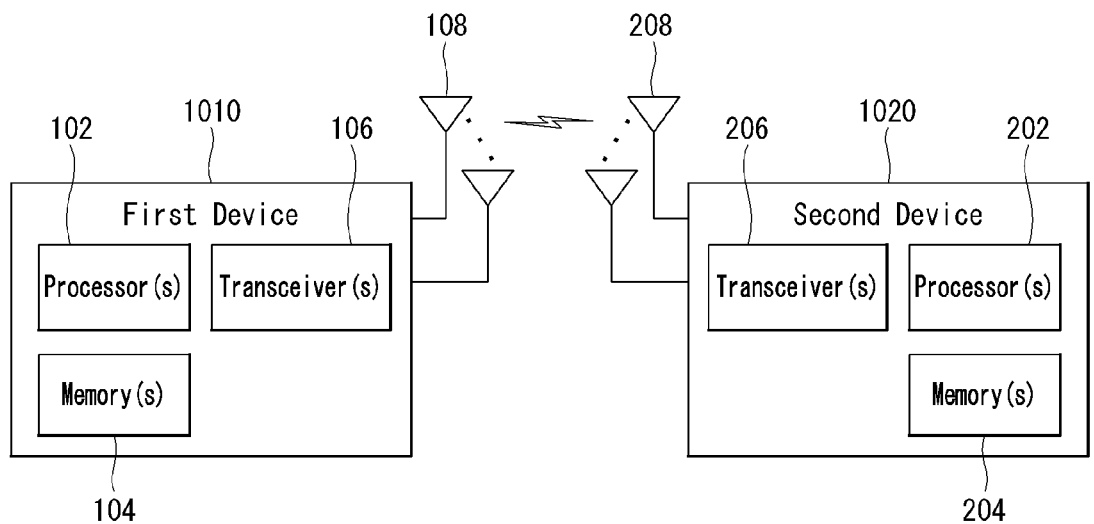
FIG. 23 illustrates a wireless device which may be applied to the present disclosure.

FIG. 23 illustrates a wireless device which may be applied to the present disclosure.

Referring to FIG. 23, a first wireless device 100 and a second wireless device 200 may transmit/receive radio signals through various wireless access technologies (e.g., LTE and NR). Here, the first wireless device 100 and the second wireless device 200 may correspond to a wireless device 100x and an eNB 200 and/or a wireless device 100x and a wireless device 100x of FIG. 22.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 10 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be mixed with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g. baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or instructions. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to which Present Disclosure is Applied

Figure 24:
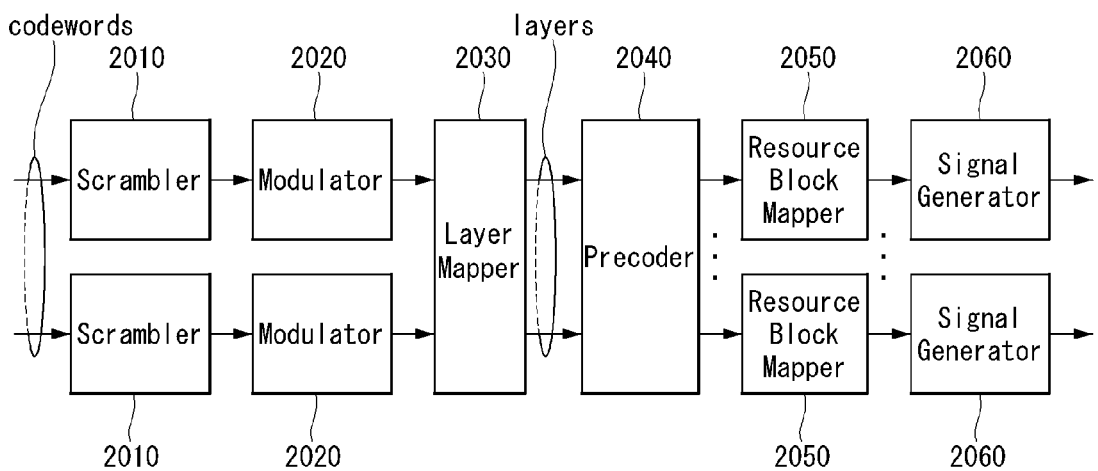
FIG. 24 illustrates a signal processing circuit applied to the present disclosure.

FIG. 24 illustrates a signal processing circuit applied to the present disclosure.

Referring to FIG. 24 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 24 may be performed by the processors 102 and 202 and/or the transceivers 106 and 206 of FIG. 23. Hardware elements of FIG. 24 may be implemented in the processors 102 and 202 and/or the transceivers 106 and 206 of FIG. 23. For example, blocks 1010 to 1060 may be implemented in the processors 102 and 202 of FIG. 23. Further, blocks 1010 to 1050 may be implemented in the processors 102 and 202 of FIG. 23 and the block 1060 of FIG. 23 and the block 2760 may be implemented in the transceivers 106 and 206 of FIG. 26.

A codeword may be transformed into a radio signal via the signal processing circuit 1000 of FIG. 24. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 24. For example, the wireless device (e.g., 100 or 200 of FIG. 23) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

Figure 25:
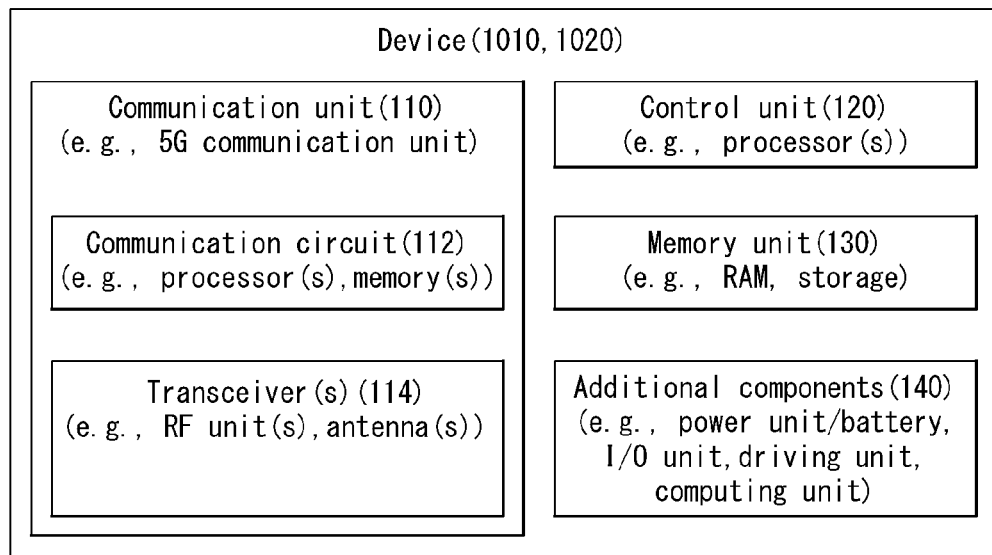
FIG. 25 illustrates another example of a wireless device applied to the present disclosure.

FIG. 25 illustrates another example of a wireless device applied to the present disclosure.

The wireless device may be implemented as various types according to a use example/service (see FIG. 22). Referring to FIG. 25, wireless devices 100 and 200 may correspond to the wireless devices 100 and 200 of FIG. 23 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 23. For example, the transceiver(s) 114 may include one or more transceivers 106 and 206 and/or one or more antennas 108 and 208 of FIG. 23. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100a of FIG. 22, the vehicles 100b-1 and 100b-2 of FIG. 22, the XR device 100c of FIG. 22, the portable device 100d of FIG. 22, the home appliance 100e of FIG. 22, the IoT device 100f of FIG. 22, a digital broadcasting terminal, a hologram device, a public safety device, an MTC device, a medical device, a fintech device (or financial device), a security device, a climate/environment device, an AI server/device 400 of FIG. 22, the eNB 200 of FIG. 22, a network node, etc. The wireless device may be movable or may be used at a fixed place according to a use example/service.

In FIG. 25, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements. For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Example of Portable Device to which Present Disclosure is Applied

Figure 26:
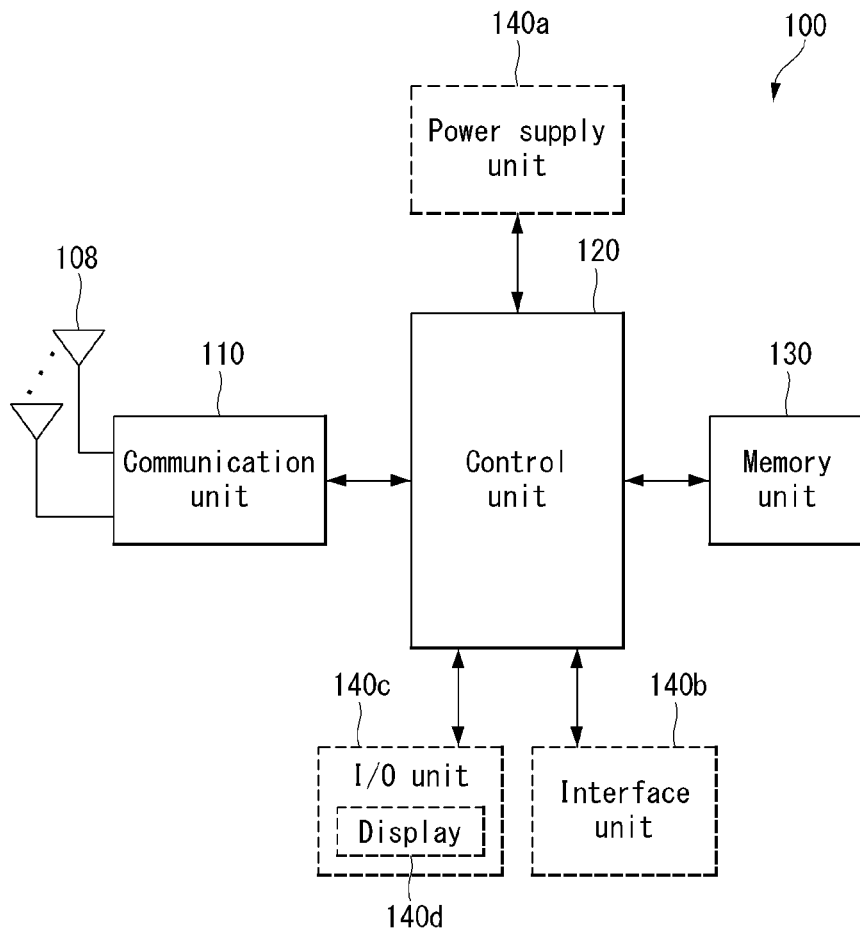
FIG. 26 illustrates a portable device applied to the present disclosure.

FIG. 26 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 26, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 25, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be considered to be exemplary. The scope of the present disclosure should be determined by rational construing of the appended claims and all modifications within an equivalent scope of the present disclosure are included in the scope of the present disclosure.

INDUSTRIAL APPLICABILITY

The present disclosure is described based on an example applied to the 3GPP LTE/LTE-A/NR system, but the present disclosure may be applied to various wireless communication systems in addition to the 3GPP LTE/LTE-A/NR system.

What is claimed is:

1. A method for transmitting a demodulation reference signal for an uplink control signal in a wireless communication system, the method performed by a terminal, comprising:
   receiving, from a base station, configuration information, wherein a transform precoding for an uplink is enabled based on the configuration information;
   generating a sequence used for the demodulation reference signal based on the configuration information; and
   transmitting, to the base station, the demodulation reference signal based on the sequence used for the demodulation reference signal,
   wherein the sequence used for the demodulation reference signal is generated based on a low peak to average power ratio (PAPR) sequence,
   wherein the low PAPR sequence is determined based on a subset of length-6 sequences having an 8-phase shift keying (PSK) symbol as an element, and
   wherein the subset of the length-6 sequences includes low PAPR i) first sequence comprising (−7, −5, −1, −7, −5, 5) as elements, ii) second sequence comprising (−7, 1, −3, 1, 5, 1) as elements, iii) third sequence comprising (−7, 1, −3, 3, 7, 5) as elements, and iv) fourth sequence comprising (−7, 3, 1, 5, −1, 3) as elements.

2. The method of claim 1, wherein each of the length-6 sequences is determined by $e^{j\varphi(i)\pi/8}$, and
   the i is an index of elements of each of the length-6 sequences.

3. The method of claim 2, wherein a value of the $\varphi(i)$ includes (−1 −7 −3 −5 −1 3), (−7 3 −7 5 −7 −3), (5 −7 7 1 5 1), (−7 3 1 5 −1 3), (−7 −5 −1 −7 −5 5), (−7 1 −3 3 7 5), and (−7 1 −3 1 5 1).

4. The method of claim 3, wherein a cyclic shifted sequence for the $\varphi(i)$ is the same sequence as the $\varphi(i)$.

5. The method of claim 4, wherein a number which the value of $\varphi(i)$ may have is $8^6$, and wherein the subset of the length-6 sequences comprises 30 length-6 sequences.

6. The method of claim 1, wherein a value of auto-correlation for the low PAPR sequence is less than a specific value.

7. The method of claim 3,
   wherein the configuration information is received via RRC signaling.

8. The method of claim 1,
   wherein a Frequency Domain Spectrum Shaping (FDSS) filter is not applied to the low PAPR sequence.

9. The method of claim 1, wherein the low PAPR sequence is subject to Frequency Division Multiplexing (FDM) with two antenna ports in a Comb-2 form.

10. The method of claim 9, wherein different PAPR sequences are used for the two antenna ports, respectively.

11. A terminal for transmitting a demodulation reference signal for an uplink control signal in a wireless communication system, the terminal comprising:
   a transceiver transceiving a radio signal; and
   a processor functionally connected to the transceiver,
   wherein the processor is configured to control the terminal to:
   receive, from a base station, configuration information;
   generate a sequence used for the demodulation reference signal based on the configuration information, and
   transmit, to the base station, the demodulation reference signal based on the sequence used for the demodulation reference signal, and
   wherein a transform precoding for an uplink is enabled based on the configuration information,
   wherein the sequence used for the demodulation reference signal is generated based on a low peak to average power ratio (PAPR) sequence,
   wherein the low PAPR sequence is determined based on a subset of length-6 sequences having an 8-phase shift keying (PSK) symbol as an element, and
   wherein the subset of the length-6 sequences includes low PAPR i) first sequence comprising (−7, −5, −1, −7, −5, 5) as elements, ii) second sequence comprising (−7, 1, −3, 1, 5, 1) as elements, iii) third sequence comprising (−7, 1, −3, 3, 7, 5) as elements, and iv) fourth sequence comprising (−7, 3, 1, 5, −1, 3) as elements.

12. The terminal of claim 11, wherein each of the length-6 sequences is determined by $e^{j\varphi(i)\pi/8}$, and
   the i is an index of elements of each of the length-6 sequences.

13. The terminal of claim 12, wherein a value of the $\varphi(i)$ includes (−1 −7 −3 −5 −1 3), (−7 3 −7 5 −7 −3), (5 −7 7 1 5 1), (−7 3 1 5 −1 3), (−7 −5 −1 −7 −5 5), (−7 1 −3 3 7 5), and (−7 1 −3 1 5 1).

14. The terminal of claim 12, wherein a cyclic shifted sequence for the $\varphi(i)$ is the same sequence as the $\varphi(i)$.

15. The terminal of claim 11, wherein the configuration information is received via RRC signaling.

16. An apparatus comprising:
   one or more memories; and
   one or more processors functionally connected to the one or more memories,
   wherein the one or more processors control the apparatus to
   receive, from a base station, configuration information,
   generate a sequence used for a demodulation reference signal based on the configuration information, and
   transmit, to the base station, the demodulation reference signal based on the sequence used for the demodulation reference signal, wherein a transform precoding for an uplink is enabled based on the configuration information, wherein the sequence used for the demodulation reference signal is generated based on a low peak to average power ratio (PAPR) sequence, wherein the low PAPR sequence is determined based on a subset of length-6 sequences having an 8-phase shift keying (PSK) symbol as an element, and wherein the subset of the length-6 sequences includes low PAPR i) first sequence comprising (−7, −5, −1, −7, −5, 5) as elements, ii) second sequence comprising (−7, 1, −3, 1, 5, 1) as elements, iii) third sequence comprising (−7, 1, −3, 3, 7, 5) as elements, and iv) fourth sequence comprising (−7, 3, 1, 5, −1, 3) as elements.

17. One or more non-transitory computer-readable recording media storing one or more instructions, wherein one or more instructions executable by one or more processors control a terminal to:

receive, from a base station, configuration information, generate a sequence used for a demodulation reference signal based on the configuration information, and transmit, to the base station, the demodulation reference signal based on the sequence used for the demodulation reference signal, wherein a transform precoding for an uplink is enabled based on the configuration information, wherein the sequence used for the demodulation reference signal is generated based on a low peak to average power ratio (PAPR) sequence, wherein the low PAPR sequence is determined based on a subset of length-6 sequences having an 8-phase shift keying (PSK) symbol as an element, and wherein the subset of the length-6 sequences includes low PAPR i) first sequence comprising (−7, −5, −1, −7, −5, 5) as elements, ii) second sequence comprising (−7, 1, −3, 1, 5, 1) as elements, iii) third sequence comprising (−7, 1, −3, 3, 7, 5) as elements, and iv) fourth sequence comprising (−7, 3, 1, 5, −1, 3) as elements.

18. The method of claim 1, wherein the low PAPR sequence is determined based on a subset of length-6 sequences which are selected among the length-6 sequences having the 8-PSK symbol as the element based on PAPR threshold values, and wherein the PAPR threshold values comprises first threshold value when applying FDSS filter and second threshold value when no FDSS filter is applied.

19. The method of claim 18, wherein length-6 sequences having a PAPR value less than or equal to the first threshold value and the second threshold value are selected, and wherein the low PAPR sequence is determined based on the selected subset of the length-6 sequences.

* * * * *